United States Patent
Holbrook et al.

(10) Patent No.: US 11,253,836 B2
(45) Date of Patent: Feb. 22, 2022

(54) METHOD FOR ENHANCING VOLUMETRIC CAPACITY IN GAS STORAGE AND RELEASE SYSTEMS

(71) Applicant: Ingevity South Carolina, LLC, North Charleston, SC (US)

(72) Inventors: Billy-Paul M. Holbrook, Mount Pleasant, SC (US); Laurence H. Hiltzik, Charleston, SC (US); Robert W. Mims, Dorchester, SC (US); Rey P. Bongalonta, Goose Creek, SC (US); Kenechukwu Onubogu, North Charleston, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 0 days.

(21) Appl. No.: 17/222,941

(22) Filed: Apr. 5, 2021

(65) Prior Publication Data

US 2021/0220800 A1 Jul. 22, 2021

Related U.S. Application Data

(60) Division of application No. 16/872,945, filed on May 12, 2020, now Pat. No. 11,052,376, which is a
(Continued)

(51) Int. Cl.
*B01J 20/20* (2006.01)
*B01J 20/28* (2006.01)
(Continued)

(52) U.S. Cl.
CPC ......... *B01J 20/20* (2013.01); *B01J 20/28011* (2013.01); *B01J 20/28042* (2013.01);
(Continued)

(58) Field of Classification Search
CPC .. B01J 20/20; B01J 20/28042; B01J 20/3007; B01D 39/2062; B01D 53/0415;
(Continued)

(56) References Cited

U.S. PATENT DOCUMENTS

| 4,960,450 A | 10/1990 | Schwarz et al. |
| 4,972,658 A | 11/1990 | Greenbank |

(Continued)

FOREIGN PATENT DOCUMENTS

| CN | 2006/10013838 | 11/2007 |
| JP | 2004116565 A | 4/2004 |

(Continued)

OTHER PUBLICATIONS

J. Jagiello and J. P. Olivier, "A Simple Two-Dimensional NLDFT Model of Gas Adsorption in Finite Carbon Pores. Application to Pore Structure Analysis", J. Phys. Chem., 2009, 113, 19382-19385.
(Continued)

*Primary Examiner* — Sharon Pregler
(74) *Attorney, Agent, or Firm* — Bryan D. Zerhusen; Nicholas R. Herrel; Cantor Colburn LLP

(57) ABSTRACT

The present disclosure provides for a porous gas sorbent monolith with superior gravimetric working capacity and volumetric capacity, a gas storage system including a porous gas sorbent monolith of the present disclosure, methods of making the same, and method for storing a gas. The porous gas sorbent monolith includes a gas adsorbing material and a non-aqueous binder.

17 Claims, 9 Drawing Sheets

Related U.S. Application Data continuation of application No. 15/640,037, filed on Jun. 30, 2017, now Pat. No. 10,688,467.

(60) Provisional application No. 62/464,955, filed on Feb. 28, 2017, provisional application No. 62/357,613, filed on Jul. 1, 2016.

(51) Int. Cl.
*B01J 20/30* (2006.01)
*F17C 11/00* (2006.01)

(52) U.S. Cl.
CPC ..... *B01J 20/28083* (2013.01); *B01J 20/3035* (2013.01); *F17C 11/007* (2013.01); *F17C 2201/0104* (2013.01); *F17C 2201/0128* (2013.01); *F17C 2221/033* (2013.01); *F17C 2223/035* (2013.01)

(58) Field of Classification Search
CPC .............. B01D 39/1623; B01D 39/163; B01D 39/2048; B01D 41/04; B01D 53/04; B01D 69/06; B01D 69/12
See application file for complete search history.

(56) References Cited

U.S. PATENT DOCUMENTS

| | | | |
|---|---|---|---|
| 5,372,619 A | 12/1994 | Greinke et al. | |
| 5,401,472 A | 3/1995 | Kawakami et al. | |
| 5,416,056 A | 5/1995 | Baker | |
| 5,614,460 A | 3/1997 | Schwarz et al. | |
| 5,626,637 A | 5/1997 | Baker | |
| 5,710,092 A | 1/1998 | Baker | |
| 5,837,741 A | 11/1998 | Schwarz et al. | |
| 5,912,424 A | 6/1999 | Judkins et al. | |
| 5,916,245 A | 6/1999 | Tom | |
| 5,965,483 A | 10/1999 | Baker et al. | |
| 5,998,647 A | 12/1999 | Seki et al. | |
| 6,030,698 A | 2/2000 | Burchell et al. | |
| 6,110,257 A | 8/2000 | Tom | |
| 6,135,431 A | 10/2000 | Muhmel et al. | |
| 6,205,793 B1 | 3/2001 | Schimp | |
| 6,207,264 B1 | 3/2001 | Robinson et al. | |
| 6,286,304 B1 | 9/2001 | Back et al. | |
| 6,309,449 B1 | 10/2001 | Klos et al. | |
| 6,475,411 B1 | 11/2002 | Burchell et al. | |
| 6,561,213 B2 | 5/2003 | Wang et al. | |
| 6,626,981 B2 | 9/2003 | Wojtowicz et al. | |
| 7,060,653 B2 | 6/2006 | Nakamura | |
| 7,172,645 B1 | 2/2007 | Pfister et al. | |
| 7,418,782 B2 | 9/2008 | Kimbara et al. | |
| 7,516,752 B2 | 4/2009 | Arnold et al. | |
| 7,662,746 B2 | 2/2010 | Yaghi et al. | |
| 7,712,605 B2 | 5/2010 | Suzuki et al. | |
| 7,735,528 B2 | 6/2010 | Handa | |
| 7,891,386 B2 | 2/2011 | Handa | |
| 7,938,149 B2 | 5/2011 | Handa | |
| 7,955,415 B2 | 6/2011 | Farone | |
| 8,158,556 B2 | 4/2012 | Feaver et al. | |
| 8,231,712 B2 | 7/2012 | Wojtowicz et al. | |
| 8,318,356 B2 | 11/2012 | Gadkaree et al. | |
| 8,500,889 B2 | 8/2013 | Hill et al. | |
| 8,691,177 B2 | 4/2014 | Pfeifer et al. | |
| 8,734,576 B2 | 5/2014 | Zimmermann | |
| 8,790,616 B2 | 7/2014 | Pulskamp et al. | |
| 8,915,989 B2 | 12/2014 | Watanabe et al. | |
| 9,006,137 B2 | 4/2015 | Blaser et al. | |
| 9,067,848 B2 | 6/2015 | Stadie et al. | |
| 9,102,691 B2 | 8/2015 | Zhou et al. | |
| 9,188,284 B2 | 11/2015 | Luo et al. | |
| 9,409,770 B2 | 8/2016 | Ginzburg et al. | |
| 9,452,380 B2 * | 9/2016 | Hornbostel | B01J 20/28011 |
| 9,468,901 B2 | 10/2016 | Wilson et al. | |
| 2009/0229555 A1 | 9/2009 | Ginzburg et al. | |
| 2009/0295034 A1 | 12/2009 | Wu et al. | |
| 2009/0301902 A1 | 12/2009 | Gogotsi et al. | |
| 2010/0331179 A1 | 12/2010 | Feaver et al. | |
| 2011/0247495 A1 | 10/2011 | Marco | |
| 2011/0303558 A1 * | 12/2011 | Carruthers | B01D 53/0415 206/0.7 |
| 2013/0211158 A1 | 8/2013 | Romanos et al. | |
| 2014/0018238 A1 | 1/2014 | Bajaj et al. | |
| 2014/0117054 A1 | 5/2014 | Ryan et al. | |
| 2014/0120339 A1 | 5/2014 | Nikova et al. | |
| 2014/0158557 A1 | 6/2014 | Dolan et al. | |
| 2014/0274659 A1 | 9/2014 | Romanos et al. | |
| 2014/0290283 A1 | 10/2014 | Ortmann et al. | |
| 2014/0290611 A1 | 10/2014 | Abd Elhamid et al. | |
| 2015/0001101 A1 | 1/2015 | Dolan et al. | |
| 2015/0231576 A1 | 8/2015 | Stabler et al. | |
| 2015/0258487 A1 | 9/2015 | Hornbostel et al. | |
| 2016/0033081 A1 | 2/2016 | Coleman et al. | |
| 2016/0243525 A1 | 8/2016 | Song et al. | |
| 2016/0339411 A1 | 11/2016 | Bajaj et al. | |
| 2016/0346724 A1 | 12/2016 | Wang et al. | |

FOREIGN PATENT DOCUMENTS

| | | |
|---|---|---|
| JP | 2013136055 A | 7/2013 |
| JP | 2015066511 A | 4/2015 |
| RU | 127167 U1 | 4/2013 |
| WO | WO 2014/059392 | 4/2014 |
| WO | WO 2014/182861 | 11/2014 |
| WO | WO 2015/002262 | 1/2015 |
| WO | WO 2015/054332 | 4/2015 |
| WO | WO 2015/101923 | 7/2015 |
| WO | WO 2015/173545 | 11/2015 |
| WO | WO 2016/025532 | 2/2016 |
| WO | WO 2016/075129 | 5/2016 |
| WO | WO 2016/123332 | 8/2016 |
| WO | WO 2017/031260 | 2/2017 |

OTHER PUBLICATIONS

Supplementary European Search Report for Application No. EP 17821432.6, dated Feb. 4, 2020.
U.S. Appl. No. 15/640,037, filed Jun. 30, 2017, US 2018-0001296 A1.
U.S. Appl. No. 16/872,945, filed May 12, 2020, US 2020-0376562 A1.

* cited by examiner

FIG. 1A    FIG. 1B    FIG. 1C
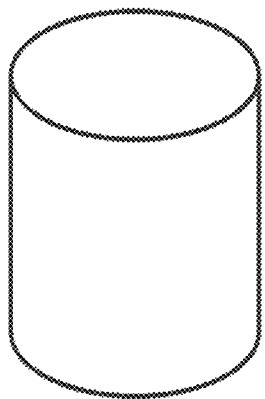  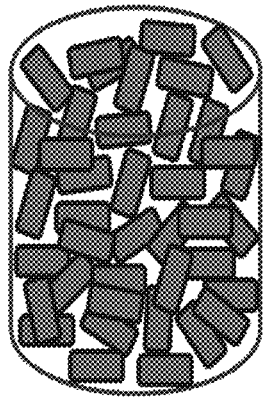  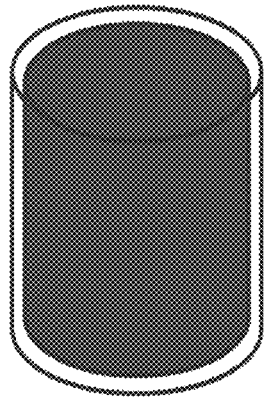
FIG. 2
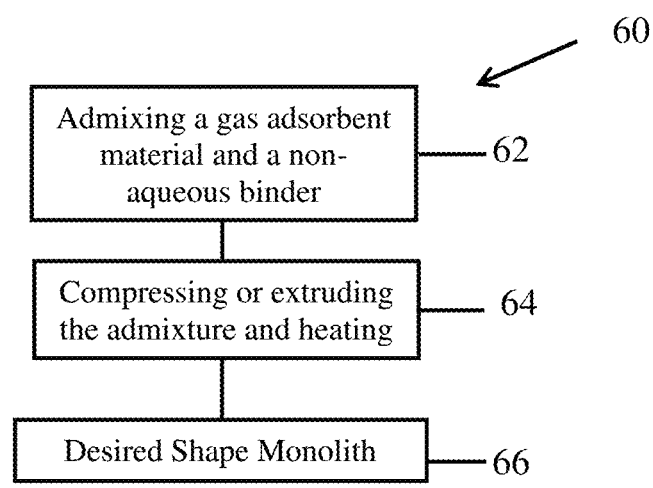

METHOD FOR ENHANCING VOLUMETRIC CAPACITY IN GAS STORAGE AND RELEASE SYSTEMS

CROSS-REFERENCE TO RELATED APPLICATIONS

This application is a Divisional Application of U.S. patent application Ser. No. 16/872,945, filed on 12 May 2020; which is a Continuation Application of U.S. patent application Ser. No. 15/640,037, filed on 30 Jun. 2017, which is now issued as U.S. Pat. No. 10,688,467, on 23 Jun. 2020; which claims priority to U.S. Provisional Application No. 62/464,955, filed on 28 Feb. 2017, and U.S. Provisional Application No. 62/357,613, filed on 1 Jul. 2016; all of which are incorporated herein by reference in their entireties.

BACKGROUND

1. Field of the Art

The present disclosure relates to gas storage systems and, in particular to porous gas adsorbable monoliths and storage systems for adsorbable gases with improved storage and delivery capacity. In addition, the description provides methods for improving working capacity or reversible storage of adsorbed gas storage systems (e.g., natural gas storage and delivery from adsorbed natural gas storage systems including activated carbon containing storage systems or adsorptive monolith-containing storage systems) by improving at least one of adsorbent density and gravimetric working capacity.

2. Description of Related Art

Adsorbed natural gas (ANG) storage systems are an alternative to the current use of compressed natural gas (CNG) cylinders because of the lower operating pressures. The reduction in operating pressures enables the use of home refueling units, reduces cost of compression and is inherently safer. Typically, ANG storage systems have an operating pressure below 1,000 psig compared to CNG cylinders, which have operating pressures that range from 3,000 to 3,600 psig.

In an ANG storage system, an adsorbent is used to store natural gas molecules, which adhere to the surface and fill certain molecular-size porosity with an adsorbed "condensed phase." The adsorbent is placed inside a gas cylinder or, a gas cylinder is formed around the adsorbent, which is then purged to remove oxygen. An adsorbent should exhibit a high volumetric working capacity and the ratio of gas released from the adsorbent compared to the gas stored on the adsorbent should ideally be one. The use of adsorbents in ANG storage system enables a gas cylinder to hold a greater mass of natural gas as compared to an empty cylinder at a comparable pressure. These adsorbents include activated carbon from a variety of raw materials including wood, peat, coal, coconut, synthetic or natural polymer and a variety of processes including chemical and/or thermal activations. Furthermore, inorganic adsorbents could be employed including, molecular sieves, porous alumina, pillared clays, porous silica, zeolites, and metal organic frameworks.

Adsorption of gas molecules on the surface of a solid and formation of the condenses phase within its pores is an exothermic phenomenon. In the ANG application, the primary adsorption is known as van der Waals forces, or weak force interactions. When the gas molecule adsorbs, heat is released because the molecule has a reduced degree of freedom (vibrational, rotational, or translational). When large amounts of gas are adsorbed, the amount of heat released can be significant. In contrast, a gas molecule that desorbs is an endothermic process, meaning energy (i.e. heat) is adsorbed by the gas molecule. Again, when copious amounts of gas are released a significant temperature decrease is noted for the system.

Methane, the most abundant component in natural gas, has a kinetic diameter of 3.8 Å. Computer simulations propose that the ideal pore size (e.g., diameter) for an adsorbent to store methane is approximately 9-12 Å. Historically, the focus of work on adsorbents for methane storage focused on maximizing the pore volume in this size range as well as achieving a narrow pore size distribution centered in the approximately 9-12 Å pore size range. See, e.g., U.S. Pat. Nos. 5,965,483; 5,416,056; 5,372,619; 5,614,460; 5,710,092; 5,837,741; 6,626,981; 5,626,637; 8,691,177; 8,158,556; 8,500,889; 8,915,989; 5,401,472; 9,102,691; 7,060,653; 5,998,647; 7,662,746; 8,231,712; US 2014/0018238; and WO 2014/0274659.

One limitation of striving toward a pore size distribution in the approximately 9-12 Å size range is that, while this maximizes storage, this pore size range does not correlate to delivered gas when depressurized to ambient pressures. The adsorbent performance from a practical perspective should go beyond the total gas capacity, the total amount of gas stored at maximum operating pressure, and focus on the total amount of gas released when drawn down to ambient pressures, i.e., 14.7 psi. A narrow pore size distribution of approximately 9-12 Å pore size inherently retains more gaseous molecules when depressurized to ambient pressures from high pressures because of the effect of the carbon surface surrounding the gaseous molecules. In addition, it is well known that natural gas composition contains larger sized molecules, such as ethane, butane and propane. Typical compositions of natural gas range from 89-95% methane. A surprising aspect of the present disclosure is the surprising and unexpected discovery that, for high working capacity of natural gas as opposed to methane alone, a distribution of pores in the storage region and larger pores (up to 25-30 Å) facilitate the release and effusion during depressurization. Additionally, it was surprisingly and unexpectedly advantageous to minimize the <9 Å size pore volume for better maintaining initial capacity across the many cycles of refueling. It was also unexpected that pore volume larger than 27 Å size, and even 50 Å size further enhanced storage capacity. Furthermore, many past attempts to centralize the pore size distribution of the adsorbent in the 9-12 Å range led to highly complicated activation methods and/or exotic materials partly because of the very narrow pore size distribution. Using such production methods are cost prohibitive and/or the ability to economically scale-up has yet to be proven. In some cases, the adsorbent material had improved volumetric capacity or volumetric performance (L of adsorbent per GGE, where GGE is the gasoline gallon equivalent defined as 5.66 lb of Natural Gas per the U.S. Department of Energy Alternative Fuels Data Center (www.afdc.energy.gov/fuels/equivalency_methodology.html)), while sacrificing gravimetric working capacity or gravimetric performance (lb of adsorbent per GGE). In other cases, the inverse was observed, i.e., gravimetric working capacity was increased at the expense of diminished volumetric capacity.

More recent work has focused on, in addition to advancing the adsorbent capacity, determining how to reduce the amount of gas stored or retained on the adsorbent material at ambient pressures. One route to do this is to control the temperature of the system. If the temperature is controlled, heat can be applied when the tank is depressurizing, i.e. fueling the engine, to facilitate the release of gas molecules. Vice versa, heat can be removed when the tank is pressurized, i.e. during the refueling of the ANG tank to further increase the amount of gas stored at the designated operating pressure. In certain cases, the use of an external energy source applied to the tank, the adsorbent, or other additive containing thermal conductive properties applied to the tank or adsorbent has been proposed. See, e.g., U.S. Pat. Nos. 5,912,424; 7,955,415; 7,418,782; 7,891,386; 7,735,528; 7,938,149; 9,006,137; 9,188,284; CN 2006/10013838; WO 2015/02262; US 2014/0290283; and US 2014/0290611. These methods, while enhancing the release of gaseous molecules or adsorbing at close to isothermal conditions, further complicate the overall system, as well as add weight and cost. Again, these methods have yet to be proven commercially viable due to the mentioned drawbacks.

An attribute of the adsorbent that has been relatively overlooked, compared to the amount of work focused on pore size distribution, is the structure of the adsorbent. The vast majority of adsorbents on the market today can be confined into three categories: powder, pellets and granular. The sizes of said categories are typically between 0.025 and 7 mm. Such materials are introduced into their packages by loading from overhead, which results in random packing density so that the adsorbent, at best, occupies approximately 64% of the internal volume of the container. In some cases, a vibrational device can be used on the container to slightly increase the occupied volume to between 65-70%. However, approximately a third of the container remains devoid of adsorbent. In order to maximize the internal volume of the cylinder, a more conformable structure, one that mirrors the internal shape, is desired, which would also make the fill easier and more rapid compared with particulate fills requiring vibrational treatment. Some cases have used organic binders to adhere carbon particles or carbon fibers together to increase bulk density or used carbonizable binders. See, e.g., U.S. Pat. Nos. 5,614,460; 5,837,741; 6,030,698; 6,207,264; 6,475,411; 6,626,981; US 2014/0120339; US 2015/0258487; US 2009/0229555, and U.S. Pat. No. 8,691,177 B2. Meanwhile, a lighter weight system for natural gas storage would have added value. For example, the U.S. Department of Energy Office of Energy Efficiency and Renewable Energy's Vehicle Technologies Office (https://energy.gov/eere/vehicles/vehicle-technologies-office-lightweight-materials-cars-and-trucks) estimates a 6-8% fuel economy increase for a 10% reduction of vehicle weight, equivalent to about a 1% reduction for a 30 lb reduction in weight for a 2000 lb vehicle, thereby favoring less binder and a more lightweight adsorbent for the fuel storage. Therefore, the preferred yet elusive goal has been a lightweight, shape-conforming, structured article made with densely packed adsorbent with superior and sustained natural gas storage performance with ease and less cost of manufacture, as opposed to simply a high density article made from an adsorbent.

One limitation for many of the structured articles has been in the reduction of the working capacity when adsorbents have been mixed with binder materials. Depending on the binder material, the degree in reduction of performance is beyond that of simple dilution of the adsorbent. The reduction in natural gas adsorption and desorption performance is likely attributed to the occluding of pores in the relevant pore size range, reduction of overall pore diameters resulting in restrictive molecular diffusion and effusion and obstructing the adsorbent surface. Currently used binders such as aqueous soluble binders (e.g., polar binders), including but not limited to carboxymethyl cellulose (CMC), methyl cellulose, crystalline salts of aromatic sulfonates, polyfurfuryl alcohol, etc., are mixed with an aqueous solvent and adsorbent material. The aqueous solvent solubilizes the binder creating gel emulsions that act to adhere carbon particles together. Inherent to the process, porosity and surface area are occluded resulting in diminished performance of the neat adsorbent. An alternative to aqueous binders is the use of certain non-solubilized, non-aqueous binders, such as clays, phenolic resins, polyacrylates, poly vinyl acetates, polyvinylidene chloride (PVDC), ultra-high molecular weight polyethylene (UHMWPE), etc. This group of binders has, however, been observed to reduce the overall porosity of an adsorbent due to pore blocking or pore filling. Both binder groups include binders that are typically carbonized or annealed at high temperatures (>700° C.), which causes pore shrinkage and loss of pore volume. The cumulative effect yields an adsorbent article characterized with a distorted pore size distribution and deteriorated pore volume compared to the ingredient adsorbent material. Furthermore, in certain cases, the limitation has been in the manufacturing of said article. In these particular cases, the shape-specific articles require multiple thermal treatments to high temperatures resulting in corrosive gas byproducts (e.g., decomposition products from carbonization of polyvinyl chloride-type polymers) when, coupled with the cost to scale up to mass production, have halted their adaptation or narrowed their use to niche markets.

Furthermore, the processes that cause pore shrinkage result in distorted dimensions of the final shaped product. The ideal part will be formed to the inner shape of the cylinder to maximize the volumetric capacity of the tank. This is considered crucial to the application. When adsorbents are bound by, e.g., CMC (aqueous) or PVDC (non-aqueous), the final dimension of the dried, and/or carbonized shape is reduced and/or distorted from the initial dimension. This drawback, termed shrinkage, is difficult to control due to the inability to control the chemistry on a molecular level at the interface of adsorbent and binder. The concluding effect is when the shaped part is installed in the cylinder, there is significant extra void space between its outer walls and the inside cylinder wall to accommodate variable shrinkage. Beyond reduced volumetric capacity, the void space will allow for the bound adsorbent to move within the cylinder which can result in significant attrition in mobile applications potentially leading to particulates entrained in depressurized gas and leading to less adsorbent in the tank and potentially clogging downstream lines. The cumulative effect would be significantly less storage capacity. One method to combat shrinkage is to adopt oversized dimensional targets on initial parts. However, because shrinkage is difficult to predict, some parts would inevitably have final outer dimensions that are too large to fit within the confines of the manufactured fuel tank.

Therefore, a need exists for a porous gas sorbent article with a non-aqueous binder as described herein that does not diminish storage capacity of gases, that overcomes the process challenges of conventional binders, that has more reliable final physical dimensions and adsorptive performance when formed in a process, and provides an adsorbable gas storage system that is lightweight and with both improved adsorbent density, high gravimetric working capacity, and sustained level of capacity with repeated refueling, and methods to produce the same.

SUMMARY

The present description relates to a porous gas sorbent monolith (e.g. an activated carbon monolith), methods of making a porous gas sorbent monolith, and methods and systems for using the same. In particular, it was surprisingly and unexpectedly discovered that certain combinations of a gas sorbent material characterized with a significant pore volume in the approximately 9-27 Å and a non-aqueous binder as described herein provided a porous gas sorbent monolith with superior and better predictable dimensions, volumetric capacity and/or gravimetric capacity.

In certain embodiments, approximately 10%, 20%, 30%, 40%, 50%, 60%, 70%, 80%, 90%, 95% or more (including all values and ranges in between) of the pores are in the range of 9-27 Å. In certain embodiments, greater than 50%, 60%, 70%, 80%, 90%, 95% or more (including all values and ranges in between) of the pores are in the range of 9-27 Å. In certain embodiments, greater than 60% of the pores are in the range of 9-27 Å. In certain embodiments, greater than 70% of the pores are in the range of 9-27 Å. In certain embodiments, greater than 80% of the pores are in the range of 9-27 Å. In certain embodiments, greater than 90% of the pores are in the range of 9-27 Å. In certain embodiments, greater than 95% of the pores are in the range of 9-27 Å. In certain other embodiments, approximately 10%, 20%, 30%, 40%, 50%, 60%, 70%, 80%, 90%, 95% or more (including all values and ranges in between) of the pores are in the range of about 12-27 Å. In certain embodiments, greater than 50%, 60%, 70%, 80%, 90%, 95% or more (including all values and ranges in between) of the pores are in the range of about 12-27 Å. In certain embodiments, greater than 30% of the pores are in the range of 12-27 Å. In certain embodiments, greater than 40% of the pores are in the range of about 12-27 Å. In certain embodiments, greater than 50% of the pores are in the range of about 12-27 Å. In certain embodiments, greater than 60% of the pores are in the range of about 12-27 Å. In certain embodiments, greater than 70% of the pores are in the range of about 12-27 Å. In certain embodiments, greater than 80% of the pores are in the range of about 12-27 Å.

For example, in any aspect or embodiment described herein, the monolith comprises at least one of: <about 100 cc/L-M volume in pores smaller than about 9 Å size; >about 200 cc/L-M volume in pores about 9-27 Å size; >about 50 cc/L-M volume in pores about 27-490 Å size; or a combination thereof.

An aspect of the present disclosure provides a microporous or nanoporous, monolithic carbonaceous article. The article includes a gas adsorbing material and a "non-aqueous" binder as described herein. By "non-aqueous", it is meant a binder that immobilizes and bonds powder adsorbent in a dense, adsorbent monolith structure principally by a mechanism of mechanical adhesion. The binder is added as an emulsion, as a dispersion within a solvent, or as a dry powder, and the binder is not in the form of a gel or is not solubilized by a solvent that may or may not be water. In certain embodiments, the non-aqueous binder of the present disclosure is at least one binder selected from the group consisting of a fluoropolymer (e.g. poly(vinylidene difluoride)), polytetrafluoroethylene, fluorinated ethylene propylene, or perfluoroalkoxy alkanes), a polyamide (e.g., Nylon-6,6' or Nylon-6), a polyamide, fibrillated cellulose, a high-performance plastic (e.g. polyphenylene sulfide), copolymer with a fluoropolymer, a copolymer with a polyamide, a copolymer with a polyimide, a copolymer with a high-performance plastic or a combination thereof. A high-performance plastic, high performance polymer, or high-performance thermoplastic can be any semi-crystalline or amorphous thermoplastic that has continuous service temperature of 150° C. or greater. In a particular embodiment, the non-aqueous binder of the composition of the present disclosure is present in an amount of no greater than 15 wt %. In an embodiment, the non-aqueous binder is polytetrafluoroethylene. In any aspect or embodiment describe herein, the non-aqueous binder of the present disclosure is a form of polytetrafluoroethylene. In another embodiment, the non-aqueous binder of the present disclosure is present in an amount of no greater than 10 wt % (e.g., less than 10 wt %, no greater than 7 wt %, in a range from about 2.5 wt % to about 7 wt % or from 3 wt % to about 7 wt %).

Without being constrained to theory, it is believed the surprising benefit of the non-aqueous binder described herein is attributed to immobilizing and bonding of the powder adsorbent at the external surface of the particles through a mechanism of mechanical adhesion, without a mask or continuous coating of the adsorbent particle external surface and with minimal contamination of the internal adsorbent particle porosity by the binder. By mechanical adhesion, it is meant that the non-aqueous binder as described in the present disclosure conforms to some degree, from the imposition of temperature and/or pressure, to the irregularities of the adsorbent particle surface, and then hardens in some fashion, creating a bonded, immobilized adsorbent structure. The adhesion is attained by contact with the adsorbent by binder in the form of low aspect ratio shaped particulates and/or higher aspect ratio fibers. Fibrous binder may be added with that higher aspect ratio or generated by the process. For example, heating of the blend during a shear mixing process step and heating during the compression molding or extrusion shaping step, at temperatures about the binder softening point, may aid in the desired generation of fiber shaped binder from a lower aspect ratio binder ingredient, and may aid in the efficient use of the binder for the desired mechanical adhesion. Through appropriate selection of the binder, and by preferably drying the blend of adsorbent with binder prior to shaping, undesirable shrinkage is avoided and the desired target dimensions of the monolith can be reliably and reproducibly achieved.

A further advantage of embodiments of the present disclosure, by virtue of the binder selection, the relatively low binder content, and the use of adsorbents with significant porosity in the about 9-27 Å size range as opposed to concentrated in smaller, about 9-12 Å size porosity, is the lower weight of the fuel storage tank. That is, in a certain embodiment, the monolith comprises at least one of: <about 100 cc/L-M volume in pores smaller than about 9 Å size; >about 200 cc/L-M volume in pores about 9-27 Å size; >about 50 cc/L-M volume in pores about 27-490 Å size; or a combination thereof.

In some embodiments, the gas adsorbing material is selected from the group consisting of activated carbon, a zeolite, a porous silica, a covalent organic framework, or a metal organic framework. In certain embodiments, the gas adsorbing material is present in an amount of at least 85 wt % (e.g., at least 90 wt %, greater than 90 wt %, at least 93 wt %, or greater than 93 wt %).

In further embodiments, the gas adsorbing materials is particulate activated carbon. In certain embodiments, the activated carbon is a carbonaceous material, e.g., selected from the group consisting of nutshells, coconut husk, peat, wood, coir, lignite, coal, petroleum pitch, and combinations thereof. In certain embodiments, the activated carbon is a powder form or a granular form.

In a particular embodiment, the activated carbon monolith has pore volumes ≥0.5 cc/g for pores in the size (i.e., diameter) range of approximately 9 Å to approximately 27 Å.

In other embodiments, the monolith has a part density of at least 0.4 g/cc. In an embodiment, the part density is in a range of about 0.4 g/cc to 0.8 g/cc.

In certain embodiments, the monolith has a working gravimetric capacity or gravimetric performance of less than or equal to 40 lbs/GGE (e.g., ≤30 lbs/GGE. In a particular embodiment, the working gravimetric capacity is less than or equal to 28 lbs/GGE.

In additional embodiments, the monolith has a volumetric capacity of less than or equal to 35 L/GGE. For example, the volumetric capacity may be less than 30 L/GGE or less than 25 L/GGE.

Another aspect of the present disclosure provides a method of making a porous gas sorbent monolith. The method includes: admixing a gas adsorbing material and a non-aqueous binder as described herein; compressing or extruding the mixture into a shaped structure; and applying heat to the compressed or extruded mixture. In an embodiment, further comprising placing the mixture in a tank followed by compressing the mixture.

Another aspect the present disclosure provides a method of making a porous gas sorbent monolith. The method includes: admixing a gas adsorbing material and a non-aqueous binder as described herein; compressing the mixture in the tank; and applying heat to the compressed mixture and/or tank.

In some embodiments, the monolith has at least one of the following: the non-aqueous binder of the present disclosure is selected from the group consisting of a fluoropolymer, a polyamide, a fibrillated cellulose, a polyimide, a high-performance plastic (e.g. polyphenylene sulfide), a copolymer with a fluoropolymer (e.g., poly(vinylidene difluoride) or polytetrafluoroethylene), Nylon-6, 6', Nylon-6', a copolymer with a polyamide, a copolymer with a polyimide, a copolymer with a high-performance plastic; or the gas adsorbing material is selected from the group consisting of activated carbon, a zeolite, a porous silica, a covalent organic framework, or a metal organic framework.

In an embodiment, the monolith has at least one of the following: the gas adsorbing material is present in an amount of at least 90 wt % (e.g., at least 93 wt %); the non-aqueous binder is present in an amount no greater than 10 wt % (e.g., equal to or less than 7.5 wt %, equal to or less than 7 wt %, about 2.5 wt % to about 7 wt %, or about 3 wt % to about 7 wt %.); or a combination thereof.

In additional embodiments, the monolith has at least one of the following: a part density of at least 0.4 g/cc (such as, in a range from about 0.40 g/cc to about 0.8 g/cc, about 0.4 g/cc or about 0.65 g/cc, or about 0.4 g/cc to about 0.6 g/cc); a working gravimetric capacity of 40 or less lbs/GGE (such as, 30 or less lbs/GGE or 28 or less lbs/GGE); a volumetric capacity of less than 35 L/GGE (such as, less than 30 L/GGE or less than 25 L/GGE); the gas adsorbing material is present in an amount of at least 93 wt %; the non-aqueous binder is present in an amount of about 2.5 wt % to about 7 wt %; pore volume of pores with a size in a range from about 9 Å to about 27 Å is ≥0.5 cc/g; or a combination thereof.

In certain embodiments, the step of compressing the mixture includes applying at least 1,250 psi of pressure. For example, the applied pressure can be greater than 1,500 psi.

In particular embodiments, the shaped structure or the extruded shape is at least one of substantially a cylinder, an oval prism, a cube, an elliptical prism, a rectangular prism, or an irregular shape.

An additional aspect of the present disclosure provides a gas storage system. The gas storage system includes: an envelope or container (i.e., tank or vessel) and a porous gas sorbent monolith of the present disclosure (e.g., a monolith that includes a gas adsorbing material and a non-aqueous binder as described herein) disposed therein. In certain embodiments, the envelope or container defines a body having an internal dimension and an internal volume. In certain embodiments, the adsorbent comprises from about 80 to about 99% of the internal volume of the envelope or container. In certain embodiments, the container is a canister.

In an embodiment, the container is configured to withstand at least 1,000 psi.

In some embodiments, the monolith has at least one of the following: the non-aqueous binder of the present disclosure is at least one binder selected from the group consisting of a fluoropolymer, a polyamide, a polyimide, fibrillated cellulose, a high-performance plastic (e.g., polyphenylene sulfide), a copolymer with a fluoropolymer, a copolymer with a polyamide, a copolymer with a polyimide, or a combination thereof; or the gas adsorbing material is selected from the group consisting of activated carbon, a zeolite, a silica, a covalent organic framework, or a metal organic framework.

In other embodiments, the monolith comprises gas adsorbing material in an amount of at least 90 wt %; and non-aqueous binder in an amount no greater than 10 wt %.

In further embodiments, the monolith has at least one of the following: a part density of at least 0.4 g/cc; a working gravimetric capacity of 40 or less lbs/GGE; a volumetric capacity of 35 or less L/GGE, or a combination thereof.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the present disclosure may be utilized in numerous combinations, all of which are expressly contemplated by the present description. These additional advantages, objects and embodiments are expressly included within the scope of the present disclosure. The publications and other materials used herein to illuminate the background of the disclosure, and in particular cases, to provide additional details respecting the practice, are incorporated by reference in their entirety for all purposes.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the invention. Further objects, features and advantages of the invention will become apparent from the following detailed description taken in conjunction with the accompanying figures showing illustrative embodiments of the present disclosure, in which:

FIG. 1A illustrates an empty cylinder (i.e., tank or vessel) of a gas storage system;

FIG. 1B illustrates a cylinder (i.e., tank or vessel) of a gas storage system with gas adsorbent pellets contained therein;

FIG. 1C illustrates a cylinder (i.e., tank or vessel) of a gas storage system with a shape-specific gas adsorbent material;

FIG. 2 is a flow diagram of a method of making a monolith of the present disclosure;

DETAILED DESCRIPTION

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

Figure 4:
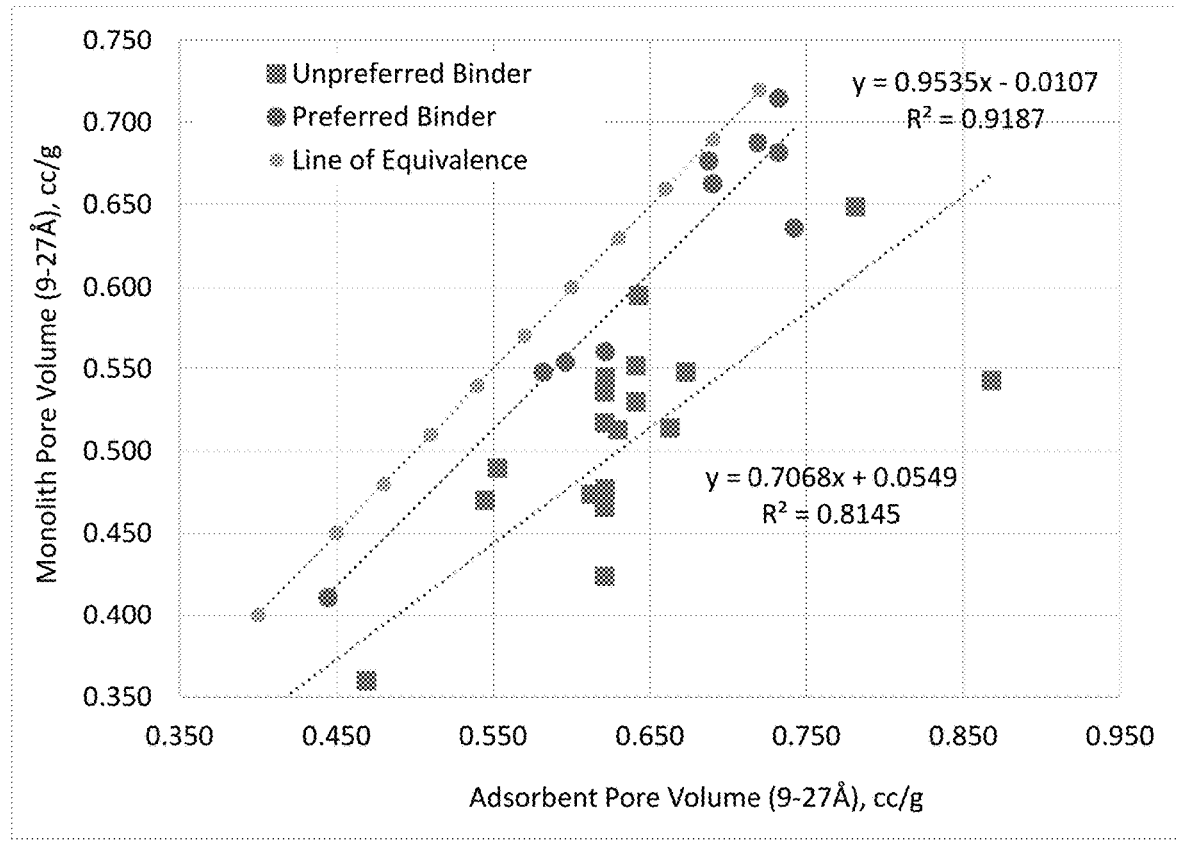
FIG. 4 is a graphical representation of pore volume 9-27 Å (cc/g) for adsorbents and respective monoliths of the present disclosure, which were normalized for weight percent of adsorbent.
Figure 5:
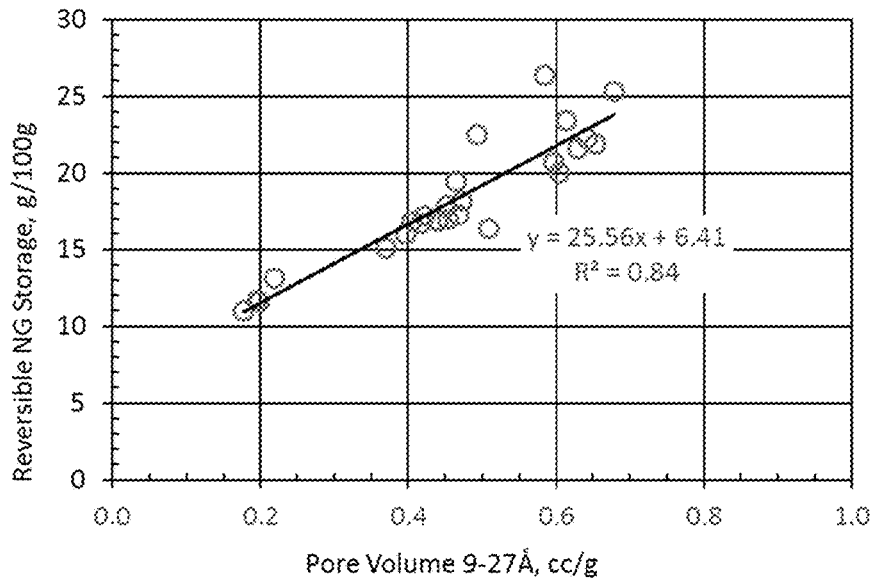
FIG. 5 is a graphical representation depicting the correlation of pore volume 9-27 Å and reversible natural gas storage capacity (wt %, when pressurized to 900 psig) of monoliths of the present disclosure.
Figure 6:
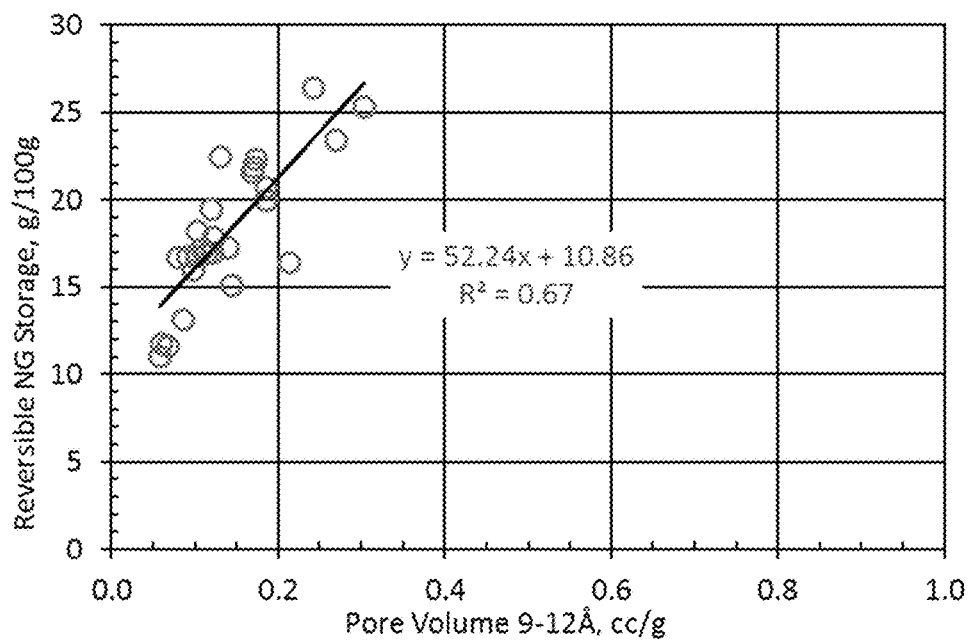
FIG. 6 is a graphical representation depicting the correlation of pore volume 9-12 Å and reversible natural gas storage capacity (wt %, when pressurized to 900 psig)

Presently described are gas adsorbing monoliths and methods of making the same, as well as a gas storage system using the same, all of which relate to the surprising and unexpected discovery that the required pore size range of the adsorbent for storage and release of natural gas should be a distribution in the range of from approximately 9 Å size micropores to approximately 27 Å size mesopores. In FIG. 5, the strong correlation between pore volume in the approximately 9 Å to approximately 27 Å size and reversible natural gas storage (as a weight %, @ 900 psig) is noted. When the pore volume of 9-12 Å is graphed versus the reversible natural gas storage (as a weight %, @ 900 psig) a correlation is not evident, as shown in FIG. 6. Therefore, while previous work on natural gas storage focused on methane, on its adsorption and on the small micropores that may have enhanced adsorptive capacity for that gas, the better design of the adsorbent for reversible natural gas storage needed to consider larger size pores that extended into the mesopore range. Furthermore, while typical binders severely occlude this micropore size range, the use of the binder of the present disclosure does not severely occlude pores or porosity in the aforementioned desirable size into the mesopore range. As shown in FIG. 4, the benefit of the nonaqueous binder of the present disclosure over previously utilized aqueous binder, is clearly evident in how the most desirable porosity of 9-27 Å of the adsorbent ingredient is close to the resulting 9-27 Å porosity of the monolith article (i.e., closer to the y=x Line of Equivalence), and is less variable. That is, compared with the previous binders, a monolith made with the binder described herein has less loss in the desirable 9-27 Å size pore volume of the ingredient adsorbent and yields a monolith with less variable reversible capacity performance because of less variability in the 9-27 Å size pore volume. In addition, as exemplified below, the binder of the present disclosure can be used to form a highly dense monolith (i.e., a monolith where its adsorbent content is maximized on a volumetric basis) that is formed to closely and reliably fit the internal dimensions of a natural gas fuel tank. This discovery substantially improves volumetric capacity of the base adsorbent and the capacity of the fuel storage tank. The present disclosure also relates to high density tangible whole shapes and/or forms of admixed adsorbents to maximize the internal container/vessel volume of gas storage systems. These tangible whole shapes and/or forms are formed to minimize binder dilution content, while maximizing the part performance.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

The following terms are used to describe the present disclosure. Unless otherwise defined, all technical and scientific terms used herein have the same meaning as commonly understood by one of ordinary skill in the art to which this disclosure belongs. The terminology used in the description is for describing particular embodiments only and is not intended to be limiting of the invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein, that include more than one step or act, the order of the steps or acts of the method is not necessarily limited to the order in which the steps or acts of the method are recited unless the context indicates otherwise.

According to an aspect, the present disclosure provides a method of storing a gas. The method comprises contacting the gas with at least one porous gas sorbent monolith having a working gravimetric capacity of ≤40 lbs/GGE and/or a volumetric capacity of equal to or less than 35 L/GGE. The porous gas sorbent monolith may have a part density of at least 0.4 g/cc. In particular embodiments, the working gravimetric capacity is ≤30 lbs/GGE (e.g., ≤28 lbs/GGE) and/or the volumetric capacity is ≤32 L/GGE (e.g., ≤30 L/GGE).

As used herein in the specification and in the claims, the term "monolith" should be understood to include formed adsorbent structure described herein and functional fragments thereof.

In some embodiments, the porous gas sorbent monolith comprises a gas adsorbing material (e.g., at least one of activated carbon, zeolite, silica, a covalent organic framework, or metal organic frameworks) and a non-aqueous binder as described herein (e.g., at least one of a fluoropolymer a polyamide, a polyimide, a high-performance plastic, fibrillated cellulose, a copolymer with a fluoropolymer, a copolymer with a polyamide, a copolymer with a polyimide, a copolymer with a high-performance plastic, or a combination thereof). In any aspect or embodiment described herein, the non-aqueous binder described herein is a fusing agent/binder. The fluoropolymer may be selected from the group consisting of poly(vinylidene difluoride), polytetrafluoroethylene, perfluoroalkoxy alkanes, and fluorinated ethylene propylene. In any aspect or embodiment describe herein, the non-aqueous binder of the present disclosure is polytetrafluoroethylene or a derivative thereof. The polyamide may be selected from the group consisting of Nylon (e.g., Nylon-6,6' and Nylon-6). In any aspect or embodiment described herein, the non-aqueous binder of the present disclosure fuses at least some of the components of the monolith/mixture. The polyimide may be selected from the group consisting of dianhydride polymer precursor. The high-performance plastic may be selected from the group consisting of polyphenylene sulfide, polyketones, polysulfones, and liquid crystal polymers. In certain embodiments, the non-aqueous binder is present in an amount of no greater than 15 wt % and/or the gas adsorbing material is present in an amount of at least 85 wt %. The activated carbon may be derived from wood, peat moss, coconut shell, coal, walnut shell, synthetic polymers and/or natural polymers, and/or has a BET surface of about 1800 m²/g or greater. In an embodiment, the activated carbon is thermally activated, chemically activated, or a combination thereof.

In an aspect, the disclosure provides a highly adsorbent monolithic article comprising a gas adsorbent material and a non-aqueous binder as described in the present disclosure. In an embodiment, the monolith has at least one of the following: a part density of at least 0.4 g/cc; a working gravimetric capacity of 40 or less lb/GGE; a volumetric capacity less than 35 L/GGE; the gas adsorbing material present in an amount of at least 90 wt % (e.g., at least 92 wt % or at least 93 wt %); the non-aqueous binder is present in an amount of less than 10 wt % (e.g., about 2.5 wt % to about 7 wt % or equal to or less than 7 wt %); or a combination thereof.

In another aspect, the disclosure provides a highly adsorbent monolithic article comprising a gas adsorbent material, wherein the monolith has a working gravimetric capacity of 40 or less lbs/GGE and/or a volumetric capacity less than 35 L/GGE. Furthermore, the monolith may have a part density of at least 0.4 g/cc. In another embodiment, the monolith further comprises a non-aqueous binder, as described herein. For example, in any aspect or embodiment described herein, the non-aqueous binder of the present disclosure is, or derived from, polytetrafluoroethylene.

In any aspect or embodiment described herein, the adsorbent monolith may comprise at least one of: <about 100 cc/L-M volume in pores smaller than about 9 Å size or diameter; >about 200 cc/L-M volume in pores about 9-27 Å size or diameter; >about 50 cc/L-M volume in pores about 27-490 Å size or diameter; or a combination thereof. For example, pores of about 9-27 Å size of the monolith or article may have a volume of >about 200 cc/L-M, >about 210 cc/L-M, >about 220 cc/L-M, >about 230 cc/L-M, >about 240 cc/L-M, >about 250 cc/L-M, >about 260 cc/L-M, >about 270 cc/L-M, or >275 cc/L-M. Pores of less than about 9 Å of the monolith or article may have a volume of <about 100 cc/L-M, <about 98 cc/L-M, <about 95 cc/L-M, <about 90 cc/L-M, or <about 85 cc/L-M. Pore of about 27-490 Å of the monolith or article may have a pore volume of >about 50 cc/L-M, >about 55 cc/L-M, >about 60 cc/L-M, or >about 65 cc/L-M.

In an embodiment, the non-aqueous binder of the present disclosure is at least one of a fluoropolymer (e.g., poly (vinylidene difluoride), polytetrafluoroethylene, perfluoroalkoxy alkane, or fluorinated ethylene propylene), a polyamide (e.g., Nylon-6,6' or Nylon-6), a polyimide, a high-performance plastic (e.g. polyphenylene sulfide), a copolymer with a fluoropolymer, a copolymer with a polyamide, a copolymer with a polyimide, a copolymer with a high-performance plastic or a combination thereof. In a particular embodiment, the non-aqueous binder of the composition of the present disclosure is present in an amount of no greater than 10 wt %. For example, the non-aqueous binder of the composition of the present disclosure can be present in an amount of about 2.5 to about 10 wt %, about 5.0 to about 10 wt %, about 7.5 wt % to about 10 wt %, about 9 to about 10 wt %, about 2.5 to about 8 wt %, about 5.0 to about 8 wt %, about 6.5 wt % to about 8 wt %, about 2.5 to about 7 wt %, about 5.0 to about 7 wt %, about 2.5 to about 5.0 wt %, or no greater than 2.5 wt %. In a particular embodiment, the non-aqueous binder is present in an amount of about 1 wt %, about 1.5 wt %, about 2 wt %, about 2.5 wt %, about 3 wt %, about 3 wt %, about 4 wt %, about 4.5 wt %, about 5 wt %, about 5.5 wt %, about 6 wt %, about 6.5 wt %, about 7 wt %, about 7.5 wt %, about 8 wt %, about 8.5 wt %, about 9 wt %, about 9.5 wt %, or about 10 wt %.

In some embodiments, the gas adsorbing material can comprise any suitable gas adsorbing material generally known in the art or that becomes known. Those of skill in the art will recognize that certain types of gas adsorbing materials are particularly useful for a gas adsorbing monolith, which are expressly contemplated herein. For example, in certain embodiments, the gas adsorbing material is at least one of activated carbon, zeolite, silica, covalent organic framework, metal organic frameworks, or a combination thereof. In certain embodiments, the gas adsorbing material is present in an amount of at least 90 wt %. For example, the gas adsorbing material can be present in an amount of at least 90 wt %, at least about 92.5 wt %, at least about 95 wt %, at least about 97 wt %, about 90.0 to about 99 wt %, about 92.5 wt % to about 99 wt %, about 95.0 to about 99 wt %, about 90.0 to about 97.5 wt %, about 92.5 wt % to about 97.5 wt %, about 95.0 to about 97.5 wt %, about 90.0 to about 95.0 wt %, about 92.5 wt % to about 95.0 wt %, or about 90.0 to about 92.5 wt %. In a particular embodiment, the gas adsorbing material is present in an amount of about 90 wt %, about 90.5 wt %, about 91 wt %, about 91.5 wt %, about 92 wt %, about 92.5 wt %, about 93 wt %, about 93.5 wt %, about 94 wt %, about 94.5 wt %, about 95 wt %, about 95.5 wt %, about 96 wt %, about 96.5 wt %, about 97 wt %, about 97.5 wt %, about 98 wt %, about 98.5 wt %, about 99 wt %, or about 99.5 wt %.

In any of the aspects or embodiments described herein, the gas adsorbent material is in the form of a fine powder, e.g. activated carbon. In any of the aspects or embodiments described herein, the gas adsorbent material is a granular form, e.g. activated carbon. Activated carbon is a non-graphitic microcrystalline form of carbon processed into carbon particles with relatively high microporosity. Activated carbon is comprised of six-member carbon rings with areas of amorphous carbon there between. Activated carbon can contain residual oxygen, nitrogen, hydrogen, phosphorous, and/or compounds thereof. The International Union of Pure and Applied Chemistry classifies pores according to their width. Micropores include pores that are less than about 2 nanometers (20 Å) in diameter or size. Mesopores includes pores that are about 2 to about 50 nanometers in diameter or size. Macropores are pores that are more than 50 nanometers in diameter or size.

In further embodiments, the gas adsorbing materials is activated carbon selected from the group consisting of nutshells, coconut husk, peat, wood, coir, lignite, coal, petroleum pitch, and combinations thereof.

In an embodiment, the activated carbon can have an average pore size ranging from about 0.8 nm (nanometers) to about 3.5 nm. In a particular embodiment, the activated carbon can have an average pore size ranging from about 0.6 to about 2.6 nm. The activated carbon can have a minimal porosity of greater than 6.0 nm. In some embodiments, the activated carbon has a particle size in a range of about 1.0 μm (microns) to about 2.83 mm (millimeters). In particular embodiments, the active carbon has a particle size in a range of about 5 tin to about 120 μm or about 15 μm to about 120 μm.

In a particular embodiment, the activated carbon monolith has pore volumes >0.5 cc/g (e.g., >0.55 cc/g or 0.60 cc/g or >0.60 cc/g) for pores in the size range of approximately 9 Å to approximately 27 Å. The pore volumes were determined by nitrogen adsorption porosimetry using a Micromeritics ASAP 2420 (Norcross, Ga.). Briefly, example/samples are dried overnight in an oven preset to 105-110° C. Samples are removed and contained in a closed system until temperature has come to equilibrium with the laboratory. The sample is inserted into the instrument sample tube and placed on a Micromeritics ASAP 2420 instrument. Samples are degassed in-situ prior to starting the test. Degassing of the sample is conducted at 200° C. and a vacuum of 2 μmHg. Data reported here may be collected on samples degassed at a lower temperature than 200° C. to prevent binder burn-off. The determination of pore volumes are calculated from the P/Po isotherm curve using the SAIEUS program. The non-ideality factor was 0.0000620. The density conversion factor was 0.0015468. The hard-sphere diameter was 3.860 Å. The molecular cross-sectional area was 0.162 nm2. Target relative pressures (in mmHg) for the isotherm were the following: 0.002, 0.005, 0.01, 0.0125, 0.0250, 0.050, 0.075, 0.1, 0.1125, 0.125, 0.150, 0.175, 0.20, 0.25, 0.30, 0.40, 0.45, 0.50, 0.55, 0.60, 0.65, 0.70, 0.75, 0.80, 0.85, 0.90, and 0.95. At low pressures the equipment is set to "Low Pressure incremental dose mode" which instructs the instrument to record data based on incremental dosages in the amount of 20.0000 cm$^3$/g STP. Actual points were recorded within an absolute or relative pressure tolerance of 5 mmHg or 5% respectively, whichever was more stringent. Time between successive pressure readings was during equilibration was 20 s. When the $\Delta$P between readings was <0.001%, the data was taken and P was set to the next set point. Minimum time delay between recording data was 600 seconds. The nitrogen adsorption isotherm data was analyzed by the SAIEUS program (using the "Carbon N2-2D-NLDFT" model). The "Max" field of pore size range is changed to 500. On the L-curve chart, Lambda value is set by scrolling the bar to locate the tangent point on the curve. The mathematical model to process the isotherm data garnered by the Micromeritics instrument to determine pore size distribution is described as nonlocal density functional theory (NLDFT). This model appears to minimize error associated at the low pressure range (equating to small pores), noted in J. Phys. Chem., 2009, 113, 19382-19385 by J. Jagiello and J. P. Olivier.

One type of activated carbon suitable for use in practicing the present disclosure is commercially available from Ingevity®, North Charleston, S.C., USA, under the designation Nuchar® SA-1500. Nuchar® WV-A 1500, and/or Nuchar® BAX 1500. In certain embodiments, suitable activated carbon includes coconut activated carbon and coal-based activated carbon.

In an embodiment, the monolith has a part density of at least 0.4 g/cc. For example, the part density of the monolith may be: about 0.40 g/cc to about 2.00 g/cc; about 0.40 g/cc to about 1.50 g/cc; about 0.40 g/cc to about 1.25 g/cc; about 0.40 g/cc to about 1.00 g/cc; about 0.40 g/cc to about 0.80 g/cc; about 0.40 g/cc to about 0.75 g/cc; about 0.40 g/cc to about 0.65 g/cc; about 0.40 g/cc to about 0.55 g/cc; about 0.40 g/cc, to about 0.55 g/cc; about 0.50 g/cc to about 2.00 g/cc; about 0.50 g/cc to about 1.50 g/cc; about 0.50 g/cc to about 1.25 g/cc; about 0.50 g/cc to about 1.00 g/cc; about 0.50 g/cc to about 0.75 g/cc; about 0.60 g/cc to about 2.00 g/cc; about 0.60 g/cc to about 1.50 g/cc; about 0.60 g/cc to about 1.25 g/cc; about 0.60 g/cc to about 1.00 g/cc; about 0.70 g/cc to about 2.00 g/cc; about 0.70 g/cc to about 1.50 g/cc; about 0.70 g/cc to about 1.25 g/cc; about 0.70 g/cc to about 1.00 g/cc; about 1.00 g/cc to about 2.00 g/cc; about 1.00 g/cc to about 1.50 g/cc; about 1.00 g/cc to about 1.25 g/cc; about 1.25 g/cc to about 2.00 g/cc; about 1.25 g/cc to about 1.50 g/cc; or about 1.50 g/cc to about 2.00 g/cc. In a particular embodiment, the part density is about 0.40 g/cc, about 0.4 g g/cc, about 0.50 g/cc, about 0.55 g/cc, about 0.60 g/cc, about 0.65 g/cc, about 0.70 g/cc, about 0.75 g/cc, about 0.80 g/cc, about 0.85 g/cc, about 0.90 g/cc, about 0.95 g/cc, about 1.00 g/cc, about 1.05 g/cc, about 1.10 g/cc, about 10.15 g/cc, about 1.20 g/cc, about 1.25 g/cc, about 1.30 g/cc, about 1.35 g/cc, about 1.40 g/cc, about 1.40 g/cc, about 1.50 g/cc, about 1.55 g/cc, about 1.60 g/cc, about 1.65 g/cc, about 1.70 g/cc, about 1.75 g/cc, about 1.80 g/cc, about 1.85 g/cc, about 1.90 g/cc, about 1.95 g/cc, or about 2.00 g/cc.

Part density can be determined by any method known to one skilled in the art. For example, part density can be determined by making a cylindrical part from the admixture and heating the part in an oven for ≥12 hours at 110° C. and measuring the mass. The diameter and length are determined with calipers. The recorded mass is divided by the calculated volume. In certain cases, the monolith is formed in-situ, e.g. that the shaped monolith article dimensionally conforms to the container inner dimensions. The part density is then measured by the internal volume of the container and the weight of the admixture filled after container has undergone a step to remove moisture as aforementioned, i.e. heating container with material in an oven for >12 hours at 110° C.

In certain embodiments, the monolith has a working gravimetric capacity of 40 or less lbs/GGE. For example, the monolith has a working gravimetric capacity of: about 5 to about 40 lbs/GGE, about 10 to about 40 lbs/GGE, about 15 to about 40 lbs/GGE, about 20 to about 40 lbs/GGE, about 25 to about 40 lbs/GGE, about 30 to about 40 lbs/GGE, about 35 to about 40 lbs/GGE, less than about 35 lbs/GGE, about 5 to about 35 lbs/GGE, about 10 to about 35 lbs/GGE, about 15 to about 35 lbs/GGE, about 20 to about 35 lbs/GGE, about 25 to about 35 lbs/GGE, about 30 to about 35 lbs/GGE, less than about 30 lbs/GGE, about 5 to about 30 lbs/GGE, about 10 to about 30 lbs/GGE, about 15 to about 30 lbs/GGE, about 20 to about 30 lbs/GGE, about 25 to about 30 lbs/GGE, less than about 25 lbs/GGE, about 5 to about 25 lbs/GGE, about 10 to about 25 lbs/GGE, about 15 to about 25 lbs/GGE, about 20 to about 25 lbs/GGE, less than about 20 lbs/GGE, about 5 to about 20 lbs/GGE, about 10 to about 20 lbs/GGE, about 15 to about 20 lbs/GGE, less than about 15 lbs/GGE, about 5 to about 15 lbs/GGE, about 10 to about 15 lbs/GGE, or about 5 to about 10 lbs/GGE. In a particular embodiment, the working gravimetric capacity of the monolith is: about 1 lbs/GGE, about 2 lbs/GGE, about 3 lbs/GGE, about 4 lbs/GGE, about 5 lbs/GGE, about 6 lbs/GGE, about 7 lbs/GGE, about 8 lbs/GGE, about 9 lbs/GGE, about 10 lbs/GGE, about 11 lbs/GGE, about 12 lbs/GGE, about 13 lbs/GGE, about 14 lbs/GGE, about 15 lbs/GGE, about 16 lbs/GGE, about 17 lbs/GGE, about 18 lbs/GGE, about 19 lbs/GGE, about 20 lbs/GGE, about 21 lbs/GGE, about 22 lbs/GGE, about 23 lbs/GGE, about 24 lbs/GGE, about 25 lbs/GGE, about 26 lbs/GGE, about 27 lbs/GGE, about 28 lbs/GGE, about 29 lbs/GGE, about 30 lbs/GGE, about 31 lbs/GGE, about 32 lbs/GGE, about 33 lbs/GGE, about 34 lbs/GGE, about 35 lbs/GGE, about 36 lbs/GGE, about 37 lbs/GGE, about 38 lbs/GGE, about 39 lbs/GGE, or about 40 lbs/GGE.

The gravimetric capacity and reversible storage (or "reversible capacity") is determined on a 4-port sample holder system equipped with a digital pressure readout, digital temperature readouts and pressure transducer calibrated for up to 1000 psig. Samples of a known part density, specifically formed to closely fit the cylindrical sample holder, are loaded into the preweighed sample holder. An internal thermocouple is located at the center inside each sample holder to monitor and control sample temperature during pressurization and depressurization. Samples are connected to the test equipment followed by outgassing at 300° F. under vacuum (24 mmHg) for a minimum of 3 hours. Samples are then allowed to cool to room temperature and vacuum is turned off. The sample holder, while closed, is disconnected and reweighed to obtain the sample weight. The sample is then pressurized with the probe gas (natural gas or methane) to the desired pressure. This is conducted slow enough to prevent internal temperature from increasing by equal to or more than 10° F. When the desired pressure is obtained, the probe gas valve is closed. The pressure inside the sample holder decreases as the internal temperature lowers. The probe gas valve is slightly opened to increase pressure back to desired range. This is repeated. When the temperature is constant and pressure does not change by 0.1% over a time span of 10 minutes, the sample holder is closed and reweighed to determine the amount of gas in the system. The sample holder is reconnected and the depressurization step is started. The temperature gauge correlating with the internal temperature of the sample is used to determine how quickly to depressurize. The temperature of the sample should not decrease by more than 10° F. When the pressure is at ambient and temperature at the predetermined set point, the sample holder is reweighed to determine the amount of gas released. The weight (in grams) of gas released is determined by the weight difference. The volume occupied in the sample holder is determined by multiplying the sample weight with the part density. The free space in the sample holder is then determined (this is calculated based on the difference between theoretical sample weight (the sample holder internal volume multiplied by the part density) and actual sample weight) followed by the amount of gas occupying the free space calculated from solving the ideal gas law equation, PV=znRT, for n, the quantity of gas moles, where z is the compressibility factor (0.87 for methane at 900 psi), P is test pressure (atm), V=free space volume (cubic centimeters), T is temperature (K), and R is the gas constant (82.05736 cm$^3$ atm K$^{-1}$ mol$^{-1}$). The weight of gas in the free space and gas remaining on sample at 0 psig is subtracted from the total weight of the gas stored at 900 psig. This value is divided by the weight of the sample to provide grams of gas reversibly stored per gram of sample. The grams of gas reversibly stored is converted to GGE using the previously cited conversion factor (2567 g-NG per GGE, equal to 5.66 lb-NG/GGE), and the mass of the sample is converted from grams to pounds to yield gravimetric capacity, as lb-monolith or -sample per GGE, or lb/GGE. The compressed natural gas blend for absorption capacity tested was obtained from Gas Innovations (La Porte Tex.; www.gasinnovations.com) in an odorized form with a certificate of analysis of 94.5% methane, 2.8% ethane, 0.3% propane, 0.1% butane, <0.5% other hydrocarbons (total), 0.9% nitrogen, and 0.9% CO$_2$.

In additional embodiments, the monolith has a volumetric performance less than 35 L/GGE. For example, the volumetric performance may be: about 15 L/GGE to about 35 L/GGE, about 17 L/GGE to about 35 L/GGE, about 19 L/GGE to about 35 L/GGE, about 21 L/GGE to about 35 L/GGE, about 23 L/GGE to about 35 L/GGE, about 25 L/GGE to about 35 L/GGE, about 27 L/GGE to about 35 L/GGE, about 29 L/GGE to about 35 L/GGE, about 31 L/GGE to about 35 L/GGE, about 33 L/GGE to about 35 L/GGE, about 15 L/GGE to about 32 L/GGE, about 17 L/GGE to about 32 L/GGE, about 19 L/GGE to about 32 L/GGE, about 21 L/GGE to about 32 L/GGE, about 23 L/GGE to about 32 L/GGE, about 25 L/GGE to about 32 L/GGE, about 27 L/GGE to about 32 L/GGE, about 29 L/GGE to about 32 L/GGE, about 15 L/GGE to about 29 L/GGE, about 17 L/GGE to about 29 L/GGE, about 19 L/GGE to about 29 L/GGE, about 21 L/GGE to about 29 L/GGE, about 23 L/GGE to about 29 L/GGE, about 25 L/GGE to about 29 L/GGE, about 15 L/GGE to about 26 L/GGE, about 17 L/GGE to about 26 L/GGE, about 19 L/GGE to about 26 L/GGE, about 21 L/GGE to about 26 L/GGE, about 23 L/GGE to about 26 L/GGE, about 15 L/GGE to about 23 L/GGE, about 17 L/GGE to about 23 L/GGE, about 19 L/GGE to about 23 L/GGE, about 15 L/GGE to about 20 L/GGE, about 17 L/GGE to about 20 L/GGE, or about 15 L/GGE to about 17 L/GGE. In a particular embodiment, the volumetric performance of the monolith is about 35 L/GGE, about 34 L/GGE, about 33.5 L/GGE, about 33 L/GGE, about 32.5 L/GGE, about 32 L/GGE, about 31.5 L/GGE, about 31 L/GGE, about 30.5 L/GGE, about 30 L/GGE, about 29.5 L/GGE, about 29 L/GGE, about 28.5 L/GGE, about 28 L/GGE, about 27.5 L/GGE, about 27 L/GGE, about 26.5 L/GGE, about 26 L/GGE, about 25.5 L/GGE, about 25 L/GGE, about 24.5 L/GGE, about 24 L/GGE, about 23.5 L/GGE, about 23 L/GGE, about 22.5 L/GGE, about 22 L/GGE, about 21 L/GGE, about 20 L/GGE, about 19 L/GGE, about 18 L/GGE, about 17 L/GGE, about 16 L/GGE, or about 15 L/GGE.

In any aspect or embodiment described herein, the adsorbent monolith of the present disclosure comprises a gas adsorbing material (e.g., activated carbon) present in an amount of at least 90 wt % (e.g., at least 93 wt %) and a non-aqueous binder as described herein (e.g., polytetrafluoroethylene) present in an amount of <10 wt % (e.g., about 2.5 wt % to about 7 wt %, about 3 wt % to about 7 wt %, ≤7.5 wt %, or ≤7 wt %), wherein the monolith has at least one of: a working gravimetric capacity of ≤40 lbs/GGE (e.g., ≤35 lbs/GGE, ≤30 lbs/GGE, or ≤28 L/GGE), a volumetric performance of ≤35 L/GGE (e.g., ≤32 L/GGE or ≤30 L/GGE), a part density of at least 0.4 g/cc (e.g., about 0.4 g/cc to about 0.75 g/cc, about 0.4 g/cc to about 0.65 g/cc, or about 0.4 g·cc to about 0.6 g/cc), pore volume of pores with a size in a range of about 9 Å to about 27 Å that is at least 0.5 cc/g, or a combination thereof.

The activated carbon monoliths described herein are a highly adsorbent, shape-specific designed monolith article. The non-aqueous binder described herein significantly increases the packing density of the adsorbent compared to normal packed adsorbent. As a result, the porous gas sorbent monoliths of the present disclosure provide significantly improved working gravimetric capacity and volumetric capacity. Furthermore, the use of shape-specific monolith articles simplifies the production of gaseous storage systems because the gas adsorbing material may be handled in the monolith form (See FIG. 1C compared to FIG. 1B). In some embodiments, the admixed material, which can be optionally dried, can be preformed in the gaseous storage system. For example, the admixed material may be placed into the gaseous storage system, e.g., in a cylinder (see, e.g., FIG. 1A), where the admixed material is compressed. Additionally, the compressed admixed materially may be heated.

According to another aspect, the present disclosure provides, as shown in FIG. 2 a method of making a porous gas sorbent monolith 60. The method includes: admixing a gas adsorbing material and a non-aqueous binder as describe herein 62; and compressing or extruding the mixture into a shaped structure 64. The mixture can be mixed by any suitable method known in the art or that becomes known in the art. For example, a mixer may be selected from the group consisting of a muller, a plow, a blender, a kneader, an extruder, and a pin mixer. In certain embodiments, admixing 62 occurs for a period of at least about 10 minutes (e.g., at least about 15 minutes, at least about 20 minutes, at least about 25 minutes, about 10-45 minutes, about 10-35 minutes, about 10-25 minutes, 10-15 minutes, or less). The method may further include drying the mixture prior to compressing or extruding the mixture. For example, the method may further include drying the mixture at a temperature of at least 110° C. The mixture may be heated during compressing. For example, the method may further include heating the compressed mixture 64 at a temperature of at least about 110° C. (e.g., about 110° C. to about 400° C.). In an embodiment, the porous gas sorbent monolith is made in the gaseous storage tank/system. This will be discussed in greater detail below.

In other embodiments, the porous gas sorbent monolith is formed in the gaseous storage system. For example, the method of making the porous gas sorbent monolith may comprise: admixing a gas adsorbing material and a non-aqueous binder as described herein; placing the mixture into a gaseous storage tank; and compressing the mixture in the gaseous storage tank. In a further embodiments, the method further comprises heating the mixture compressed in the gaseous storage tank. It should be noted that each of these steps of the method may be performed as described herein with regard to the method not associated with making the porous gas sorbent monolith in the gaseous storage system/tank. For example, the mixture can be mixed by any suitable method known in the art or that becomes known in the art, including a mixer may be selected from the group consisting of a muller, a plow, a blender, a kneader, an extruder and a pin mixer. Admixing can occur for a period of 10-15 minutes, or less. The method may further comprise drying the mixture prior to compressing the mixture. For example, the method may further include drying the mixture at a temperature of at least 110° C. The dried mixture may then be placed inside the gaseous storage system/tank followed by compressing to the inverse shape of the outside tank. The mixture may be heated during compression of at least about 110° C. (i.e. about 110° C. to about 400° C.).

The amount and characteristics of the gas adsorbent material and non-aqueous binder of the method are described above with regards to the embodiments of the activated carbon monolith.

In any of the aspects or embodiments described herein, other agents are contemplated in the production of the monolith (e.g., emulsifying agents, rheological aids, thickening agents, surfactants and dispersion aids).

Dispersion aids can be used to impart better particle stability to prevent binder-binder aggregation, carbon-carbon aggregation, and clumping of the admixture. The dispersant can impart electrostatic stabilization, steric stabilization, and/or other stabilization on the binder. The dispersant can include any suitable dispersing agent generally known in the art, or that becomes known. For example, suitable dispersants include stearates, polyethylene glycols, monostearates, distearates, polycarboxylic acids, polyethers, and block copolymers.

Thickening agents can be used to impart greater fluidity to the admixture. In any of the aspects or embodiments described herein, the method further includes adding a thickener to the activated carbon. The thickener can include any suitable thickening agent generally known in the art, or that becomes known. For example, suitable thickening agents include water-soluble polymers, such as methylcellulose, methylcellulose ether, and polyacrylic acid.

Rheological agent(s) can be used to adjust the rheological properties of the pre-wet activated carbon or the mixture. In particular, such adjustments may be required depending upon the shaping method. For example, extrusion requires a gel-like consistency. In a certain embodiment, the method further includes adding a thickening agent to the admixture. The thickening agent can include any suitable thickening agent generally known in the art, or that becomes known, as described above.

In a certain embodiment, the method further includes adding a thinning agent to the mixture. The thinning agent can include any suitable thinning agent generally known in the art, or that becomes known. For example, the thinning agent can be surfactants, such as anionic, cationic and nonionic surfactants. Examples of anionic surfactants include, but are not limited to, carboxylates, phosphates, sulfonates, sulfates, sulfoacetates, and free acids of these salts, and the like. Cationic surfactants include salts of long chain amines, diamines and polyamines, quaternary ammonium salts, polyoxyethylenated long-chain amines, long-chain alkyl pyridinium salts, lanolin quaternary salts, and the like. Non-ionic surfactants include long-chain alkyl amine oxides, polyoxyethylenated alkyl phenols, polyoxyethylenated straight-chain and branched-chain alcohols, alkoxylated lanolin waxes, polyglycol esters, lignosulfate derivatives, octophenols, nonylphenols, polyethylene glycol monoethers, dodecylhexaoxylene glycol monoethers, naphthalene sulfonates, trisodium phosphate, sodium dodecylsulfate, sodium lauryl sulfate, and the like. The particular amount of surfactant used will vary and is discernible to those of ordinary skill in the art. For example, in an embodiment, the thinning agent is present in the admixture in an amount sufficient to form an extrudable mixture.

In any of the aspects or embodiments described herein, compressing into a mold or gaseous storage system/tank or extruding with or without heating the mixture 64 into a shaped structure is formed into the desired shape by a mold (i.e., a shaped structure), gaseous storage system/tank, or extrusion. That is, to form the desired shape of the activated carbon monolith, the mixture can be cast in a mold or placed in a gaseous storage tank/system. In a particular embodiment, the guage pressure applied to the mold or the gaseous storage tank/system with the mixture is at least 1,250 psi, at least 1,500 psi, at least 3,000 psi, at least 5,000 psi, at least 7,500 psi, at least 10,000 psi, at least 12,500 psi, at least 15,000 psi, at least 30,000 psi, or at least 10,000 psi. For example, the pressure applied to the mold can be in a range of: about 1,250 psi to about 60,000 psi; about 1,250 psi to about 40,000 psi; about 1,250 psi to about 35,000 psi; about 1,250 psi to about 30,000 psi; about 1,250 psi to about 25,000 psi; about 1,250 psi to about 20,000 psi; about 1,250 psi to about 15,000 psi; about 1,250 psi to about 10,000 psi; about 1,250 psi to about 7,500 psi; about 3,000 psi to about 60,000 psi; about 3,000 psi to about 40,000 psi; about 3,000 psi to about 35,000 psi; about 3,000 psi to about 30,000 psi; about 3,000 to about 25,000 psi; about 3,000 psi to about 20,000 psi; about 3,000 psi to about 15,000 psi; about 3,000 psi to about 10,000 psi; about 3,000 psi to about 7,500 psi; about 5,000 psi to about 60,000 psi; about 5,000 psi to about 40,000 psi; about 5,000 psi to about 35,000 psi; about 5,000 psi to about 30,000 psi; about 5,000 psi to about 25,000 psi; about 5,000 psi to about 20,000 psi; about 5,000 psi to about 15,000 psi; about 5,000 psi to about 10,000 psi; about 5,000 psi to about 7,500 psi; about 6,000 psi to about 60,000 psi; about 6,000 psi to about 40,000 psi; about 6,000 psi to about 35,000 psi; about 6,000 psi to about 30,000 psi; about 6,000 psi to about 25,000 psi; about 6,000 psi to about 20,000 psi; about 6,000 psi to about 15,000 psi; about 6,000 psi to about 10,000 psi; about 6,000 psi to about 7,500 psi; about 7,000 psi to about 60,000 psi; about 7,000 psi to about 40,000 psi; about 7,000 psi to about 35,000 psi; about 7,000 psi to about 30,000 psi; about 7,000 psi to about 25,000 psi; about 7,000 psi to about 20,000 psi; about 7,000 psi to about 15,000 psi; about 7,000 psi to about 10,000 psi; about 8,000 psi to about 60,000 psi; about 8,000 psi to about 40,000 psi; about 8,000 psi to about 35,000 psi; about 8,000 psi to about 30,000 psi; about 8,000 psi to about 25,000 psi; about 8,000 psi to about 20,000 psi; about 8,000 psi to about 15,000 psi; about 8,000 psi to about 10,000 psi; about 10,000 psi to about 60,000 psi; about 10,000 psi to about 40,000 psi; about 10,000 psi to about 35,000 psi; about 10,000 psi to about 30,000 psi; about 10,000 psi to about 25,000 psi; about 10,000 psi to about 20,000 psi; about 10,000 psi to about 15,000 psi; about 15,000 psi to about 60,000 psi; about 15,000 psi to about 40,000 psi; about 15,000 psi to about 35,000 psi; about 15,000 psi to about 30,000 psi; about 15,000 psi to about 25,000 psi; about 15,000 psi to about 20,000 psi; about 20,000 psi to about 60,000 psi; about 20,000 psi to about 40,000 psi; about 20,000 psi to about 35,000 psi; about 20,000 psi to about 30,000 psi; about 20,000 psi to about 25,000 psi;' about 25,000 psi to about 60,000 psi; about 25,000 psi to about 40,000 psi; about 25,000 psi to about 35,000 psi; about 25,000 psi to about 30,000 psi; about 30,000 psi to about 60,000 psi; about 30,000 psi to about 50,000 psi; about 30,000 psi to about 40,000 psi; about 30,000 psi to about 35,000 psi; about 35,000 psi to about 60,000 psi; about 35,000 psi to about 50,000 psi; about 35,000 psi to about 45,000 psi; about 35,000 psi to about 40,000 psi; about 40,000 psi to about 60,000 psi; or about 40,000 psi to about 45,000 psi. In another embodiment, the mixture is extruded into the desired shape with any known and commercially available extruder. It is to be understood, that the activated carbon monolith can be formed into any shape desired, e.g. a cylinder, an oval prism, a cube, an elliptical prism, a rectangular prism, a pentagonal prism, etc., or even an irregular three dimensional shape.

The activated carbon monolith may have a width/diameter of (i.e., the width/diameter of the desired shape as described above, circle, oval, square, rectangle, ellipse, pentagon, irregular shape, etc.) at least 1 inch, at least 2 inches, at least 3 inches, at least 4 inches, at least 5 inches, at least 6 inches, at least 7 inches, at least 8 inches, or at least 9 inches. For example, the monolith may have a width of about 1 inch to about 10 inches, about 1 inch to about 9 inches, about 1 inch to about 8 inches, about 1 inch to about 7 inches, about 1 inch to about 6 inches, about 1 inch to about 5 inches, about 1 inch to about 4 inches, about 2 inches to about 10 inches, about 2 inches to about 9 inches, about 2 inches to about 8 inches, about 2 inches to about 7 inches, about 2 inches to about 6 inches, about 2 inches to about 5 inches, about 2 inches to about 4 inches, about 3 inches to about 10 inches, about 3 inches to about 9 inches, about 3 inches to about 8 inches, about 3 inches to about 7 inches, about 3 inches to about 6 inches, about 3 inches to about 5 inches, about 3 inches to about 4 inches, about 4 inches to about 10 inches, about 4 inches to about 9 inches, about 4 inches to about 8 inches, about 4 inches to about 7 inches, about 4 inches to about 6 inches, about 4 inches to about 5 inches, about 5 inches to about 10 inches, about 5 inches to about 9 inches, about 5 inches to about 8 inches, about 5 inches to about 7 inches, about 7 inches to about 10 inches, or about 7 inches to about 9 inches. The thickness of the activated carbon monolith may be in a range of: about 0.1 inches to about 3 inches, about 0.1 inches to about 2.5 inches, about 0.1 inches to about 2.0 inches, about 0.1 inches to about 1.5 inches, about 0.1 inches to about 1.0 inch, about 0.1 inches to about 0.5 inches, about 0.25 inches to about 3 inches, about 0.25 inches to about 2.5 inches, about 0.25 inches to about 2.0 inches, about 0.25 inches to about 1.5 inches, about 0.25 inches to about 1.0 inch, about 0.25 inches to about 0.5 inches, about 0.5 inches to about 3 inches, about 0.5 inches to about 2.5 inches, about 0.5 inches to about 2.0 inches, about 0.5 inches to about 1.5 inches, about 0.5 inches to about 1.0 inch, about 0.75 inches to about 3 inches, about 0.75 inches to about 2.5 inches, about 0.75 inches to about 2.0 inches, about 0.75 inches to about 1.5 inches, about 0.75 inches to about 1.0 inch, about 1 inch to about 3 inches, about 1 inch to about 2.5 inches, about 1 inch to about 2.0 inches, about 1 inch to about 1.5 inches, about 1.5 inches to about 3 inches, about 1.5 inches to about 2.5 inches, about 1.5 inches to about 2.0 inches, about 2 inches to about 3 inches, about 2 inches to about 2.5 inches, or about 2.5 inches to about 3 inches.

In any of the aspects or embodiments described herein, the method further comprises heating the mixture prior to compressing or extruding the mixture. In some embodiments, heating prior to compressing or extruding is performed at a temperature in a range of about 100° C. to about 300° C., 100° C. to about 290° C., 100° C. to about 280° C., 100° C. to about 270° C., 100° C. to about 260° C., 100° C. to about 250° C., 100° C. to about 240° C., 100° C. to about 230° C., about 100° C. to about 220° C., about 100° C. to about 210° C., about 100° C. to about 200° C., about 100° C. to about 190° C., about 100° C. to about 180° C., about 100° C. to about 170° C., about 100° C. to about 160° C., about 100° C. to about 140° C., 110° C. to about 300° C., 110° C. to about 290° C., 110° C. to about 280° C., 110° C. to about 270° C., 110° C. to about 260° C., about 110° C. to about 250° C., 110° C. to about 230° C., about 110° C. to about 220° C., about 110° C. to about 210° C., about 110° C. to about 200° C., about 110° C. to about 190° C., about 110° C. to about 180° C., about 110° C. to about 170° C., about 110° C. to about 160° C., 120° C. to about 300° C., 120° C. to about 290° C., 120° C. to about 280° C., 120° C. to about 270° C., 120° C. to about 260° C., about 120° C. to about 250° C., 120° C. to about 230° C., about 120° C. to about 220° C., about 120° C. to about 210° C., about 120° C. to about 200° C., about 120° C. to about 190° C., about 120° C. to about 180° C., about 120° C. to about 170° C., about 120° C. to about 160° C., 130° C. to about 300° C., 130° C. to about 290° C., 130° C. to about 280° C., 130° C. to about 270° C., 130° C. to about 260° C., about 130° C. to about 250° C., 130° C. to about 230° C., about 130° C. to about 220° C., about 130° C. to about 210° C., about 130° C. to about 200° C., about 130° C. to about 190° C., about 130° C. to about 180° C., about 130° C. to about 170° C., 140° C. to about 300° C., 140° C. to about 290° C., 140° C. to about 280° C., 140° C. to about 270° C., 140° C. to about 260° C., about 140° C. to about 250° C., about 140° C. to about 230° C., about 140° C. to about 220° C., about 140° C. to about 210° C., about 140° C. to about 200° C., about 140° C. to about 190° C., about 140° C. to about 180° C., about 140° C. to about 170° C., 150° C. to about 300° C., 150° C. to about 290° C., 150° C. to about 280° C., 150° C. to about 270° C., 150° C. to about 260° C., about 150° C. to about 250° C., about 150° C. to about 230° C., about 150° C. to about 220° C., about 150° C. to about 210° C., about 150° C. to about 200° C., about 150° C. to about 190° C., about 150° C. to about 180° C., about 150° C. to about 170° C., 160° C. to about 300° C., 160° C. to about 290° C., 160° C. to about 280° C., 160° C. to about 270° C., 160° C. to about 260° C., about 160° C. to about 250° C., about 160° C. to about 230° C., about 160° C. to about 220° C., about 160° C. to about 210° C., about 160° C. to about 200° C., about 160° C. to about 190° C., about 160° C. to about 180° C., 180° C. to about 300° C., 180° C. to about 290° C., 180° C. to about 280° C., 180° C. to about 270° C., 180° C. to about 260° C., about 180° C. to about 250° C., about 180° C. to about 230° C., about 180° C. to about 220° C., about 180° C. to about 210° C., about 180° C. to about 200° C., 200° C. to about 300° C., 200° C. to about 290° C., 200° C. to about 280° C., 200° C. to about 270° C., 200° C. to about 260° C., about 200° C. to about 250° C., about 200° C. to about 230° C., 230° C. to about 290° C., 230° C. to about 280° C., 230° C. to about 270° C., 230° C. to about 260° C., about 230° C. to about 250° C. In other embodiments, drying prior to compressing or extruding the mixture takes place at temperature of about 100° C., about 105° C., about 110° C., about 115° C., about 120° C., about 125° C., about 130° C., about 135° C., about 140° C., about 145° C., about 150° C., about 155° C., about 160° C., about 165° C., about 170° C., about 175° C., about 180° C., about 185° C., about 190° C., about 195° C., about 200° C., about 205° C., about 210° C., about 215° C., about 220° C., about 225° C., about 230° C., about 235° C., about 240° C., about 245° C., about 250° C., about 255° C., about 260° C., about 265° C., about 270° C., about 275° C., about 280° C., about 285° C., about 290° C., about 295° C., or about 300° C.

In any of the aspects or embodiments described herein, the method further comprises heating the shaped mixture 64. In some embodiments, the mixture is formed while heating in a range of about 110° C. to about 270° C., about 110° C. to about 250° C., 110° C. to about 230° C., about 110° C. to about 220° C., about 110° C. to about 210° C., about 110° C. to about 200° C., about 110° C. to about 180° C., about 110° C. to about 160° C., about 120° C. to about 270° C., about 120° C. to about 250° C., 120° C. to about 230° C., about 120° C. to about 220° C., about 120° C. to about 210° C., about 120° C. to about 200° C., about 120° C. to about 180° C., about 120° C. to about 160° C., about 130° C. to about 270° C., about 130° C. to about 250° C., 130° C. to about 230° C., about 130° C. to about 220° C., about 130° C. to about 210° C., about 130° C. to about 200° C., about 130° C. to about 180° C., about 140° C. to about 270° C., about 140° C. to about 250° C., about 140° C. to about 230° C., about 140° C. to about 220° C., about 140° C. to about 210° C., about 140° C. to about 200° C., about 140° C. to about 180° C., about 150° C. to about 270° C., about 150° C. to about 250° C., about 150° C. to about 230° C., about 150° C. to about 220° C., about 150° C. to about 210° C., about 150° C. to about 200° C., about 150° C. to about 180° C., about 160° C. to about 270° C., about 160° C. to about 250° C., about 160° C. to about 230° C., about 160° C. to about 220° C., about 160° C. to about 210° C., about 160° C. to about 200° C., about 160° C. to about 180° C., about 180° C. to about 270° C., about 180° C. to about 250° C., about 180° C. to about 230° C., about 180° C. to about 210° C., about 200° C. to about 270° C., about 200° C. to about 250° C., about 200° C. to about 230° C., about 220° C. to about 270° C., or about 220° C. to about 250° C. In other embodiments, drying takes place at temperature of about 110° C., about 120° C., about 125° C., about 130° C., about 135° C., about 140° C., about 145° C., about 150° C., about 155° C., about 160° C., about 165° C., about 170° C., about 175° C., about 180° C., about 185° C., about 190° C., about 195° C., about 200° C., about 205° C., about 210° C., about 215° C., about 220° C., about 225° C., about 230° C., about 240° C., about 250° C., about 260° C., or about 270° C.

Figure 3:
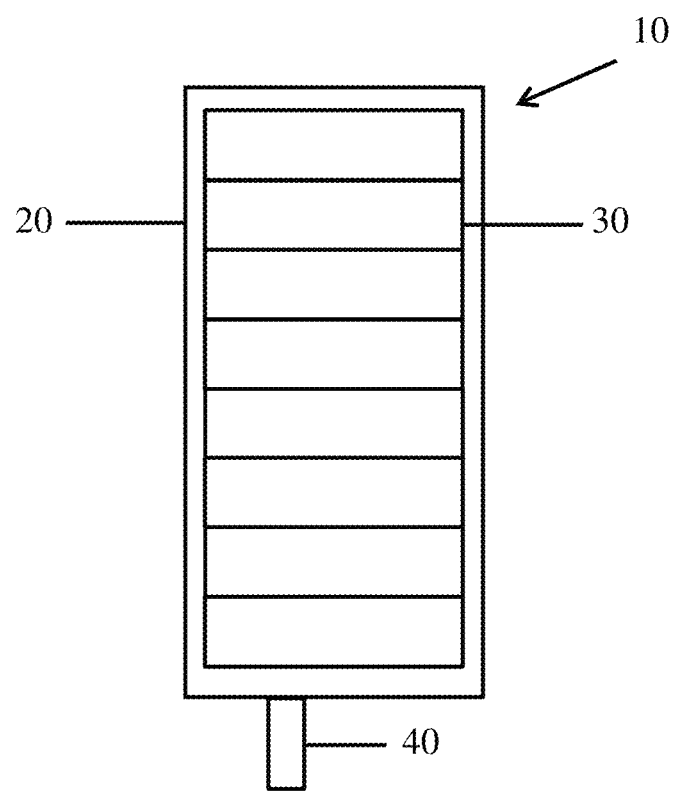
FIG. 3 illustrates a gas storage system of the present disclosure.

According to another aspect of the present disclosure, as shown in FIG. 3, a gas storage system 10 is disclosed herein. The system comprises an envelope or container 20 (i.e., a vessel or a tank), and a microporous or nanoporous, monolithic carbonaceous article (i.e. a porous gas sorbent monolith or an activated carbon monolith) 30 of the present disclosure, and which includes, e.g., a gas adsorbing material and a non-aqueous binder as described herein. In a certain embodiment, the container is configured to withstand at least 1,000 psi of pressure.

In certain embodiments, the envelope or container defines a body having an internal dimension and an internal volume. In certain embodiments, the formed adsorbent comprises from about 80 to about 99.9% of the internal volume of the envelope or container. For example, the formed adsorbent may comprise about 70 to about 99%, about 70 to about 95%, about 70 to about 90%, about 70 to about 85%, about 70% to about 80%, about 75% to about 99.9%, about 75 to about 99%, about 75 to about 95%, about 75 to about 90%, about 75 to about 85%, about 80% to about 99.9%, about 80 to about 99%, about 80 to about 95%, about 80 to about 90%, about 85% to about 99.9%, about 85 to about 99%, about 85 to about 95%, about 90% to about 99.9%, about 90 to about 99%, about 90 to about 95%, about 95% to about 99.9%, about 95 to about 99% of the internal volume of the envelope or container. In certain embodiments, the container is a tank.

In any of the aspects or embodiments described herein, the container 20 can comprise any suitable container generally known in the art or that becomes known. In a particular embodiment, the container 20 may be made of any material suitable for a reusable pressure vessel rated for a service pressure up to about 1,800 psi. In an embodiment, the pressure vessel is rated for a service pressure in a range of about 250 psi to about 1,800 psi, more specifically, about 450 psi to about 1,000 psi. Alternatively, the pressure vessel can be rated for a service pressure in a range of: about 250 psi to about 1,800 psi; about 250 psi to about 1,700 psi; about 250 psi to about 1,600 psi; about 250 psi to about 1,500 psi; about 250 psi to about 1,400 psi; about 250 psi to about 1,300 psi; about 250 psi to about 1,200 psi; about 250 psi to about 1,100 psi; about 250 psi to about 1,000 psi; about 250 psi to about 900 psi; about 350 psi to about 1,800 psi; about 350 psi to about 1,700 psi; about 350 psi to about 1,600 psi; about 350 psi to about 1,500 psi; about 350 psi to about 1,400 psi; about 350 psi to about 1,300 psi; about 350 psi to about 1,200 psi; about 350 psi to about 1,100 psi; about 350 psi to about 1,000 psi; about 350 psi to about 900 psi; about 450 psi to about 1,800 psi; about 450 psi to about 1,700 psi; about 450 psi to about 1,600 psi; about 450 psi to about 1,500 psi; about 450 psi to about 1,400 psi; about 450 psi to about 1,300 psi; about 450 psi to about 1,200 psi; about 450 psi to about 1,100 psi; about 450 psi to about 1,000 psi; about 450 psi to about 900 psi; about 550 psi to about 1,800 psi; about 550 psi to about 1,700 psi; about 550 psi to about 1,600 psi; about 550 psi to about 1,500 psi; about 550 psi to about 1,400 psi; about 550 psi to about 1,300 psi; about 550 psi to about 1,200 psi; about 550 psi to about 1,100 psi; about 550 psi to about 1,000 psi; or about 550 psi to about 900 psi. Examples of suitable container materials include high strength aluminum alloys (e.g. aluminum alloys in the 7000 series, which have relatively high yield strength), high strength low-alloy (HSLA) steels (e.g. aluminum 7075-T6), as well as plastic or low strength aluminum alloys (e.g., C-epoxy, glass fiber-polymer, strong polymer fibers such as Kevlar, Zylon, steel wires, belts, tapes, metallurgical coatings or any similar reinforcement, aluminum 6061-T6, long strand or chopped carbon fiber wraps, or the like, and any combination thereof).

According to a particular embodiment, the desired porous gas sorbent monolith 30 shape is one of a rectangular prism, a cylinder, or an oval prism. However, it is to be understood that the shape and size of the container 20 and the porous gas sorbent monolith 30 may vary depending on the particular use. Furthermore, while not shown, it is to be understood that the container 20 may be configured with other containers, so that the multiple containers 20 are in fluid (e.g., gas) communication through a manifold or other suitable mechanism.

The porous gas adsorbent monolith 30 is positioned within the container 20. As discussed above, the monolith 30 is at least capable of releasably retaining natural gas compounds (i.e., reversibly storing or adsorbing and desorbing gas molecules, such as natural gas or methane). In some examples, the monolith 30 may also be capable of reversibly storing other components found in natural gas, such as other hydrocarbons (e.g., ethane, propane, hexane, etc.), hydrogen gas, carbon monoxide, carbon dioxide, nitrogen gas, and/or hydrogen sulfide. In still other examples, the monolith 30 may be inert to some of the natural gas components and capable of releasably retaining other natural gas components.

In any of the aspects or embodiments described herein, the system 10 further comprises a device capable of charging and/or discharging the system. In a particular embodiment, the charging and/or discharging device is a port 30. It is to be understood that the device can be any suitable device generally known in the art or that becomes known capable of charging and/or discharging the system.

EXAMPLES

Comparing Monoliths with Non-Aqueous Binders to Monoliths with Aqueous Binders.

The reversible volumetric capacity and gravimetric capacity for natural gas were examined for three types of monoliths. The data are shown in Tables 1 and 2. Monoliths with an aqueous binder had a gravimetric capacity ranging from about 34 to about 48 lb/GGE and a volumetric capacity ranging from about 25 to about 31 L/GGE. Monoliths with a non-aqueous binder as described herein had an improved working gravimetric capacity ranging from about 24 to about 30 lb/GGE and a volumetric capacity ranging from about 23 to about 27 L/GGE.

TABLE 1

Specific porosity characteristics of activated carbon used in monolith Examples

| Example | Carbon | Raw Material | Company | Total Pore Volume, <320 Å (g/cc) | NG Pore Volume, 9-27 Å (g/cc) |
|---|---|---|---|---|---|
| 1-3 | Alkali Activated | Sawdust | Ingevity | 1.14 | 0.78 |
| 4-5 | PicaChem 8P | Coconut Shell | Calgon | 0.57 | 0.24 |
| 6-8 | Nuchar ® SA-1500 | Sawdust | Ingevity | 1.21 | 0.57 |

TABLE 2

Gravimetric capacity and volumetric capacity of activated carbon monoliths prepared with several types of activated carbon with either aqueous or non-aqueous binders as described herein.

| Example | Type | Carbon | Binder | Binder Conc (wt %) | Gravimetric Capacity (lbs/GGE) | Volumetric Capacity (L/GGE) | *Fraction of NG Pore Volume, (%) |
|---|---|---|---|---|---|---|---|
| 1 | Comparative | Alkali Activated | CMC | 10 | 36.4 | 25.4 | 0.83 |
| 2 | Exemplary Embodiment | Alkali Activated | PTFE | 5 | 24.2 | 23.5 | 0.98 |
| 3 | Exemplary Embodiment | Alkali Activated | KYBLOCK™ | 10 | 24.1 | 23.6 | 0.93 |
| 4 | Comparative | PicaChem 8P | UHMWPE | 15 | 48.6 | 33.7 | 0.89 |
| 5 | Comparative | PicaChem 8P | CMC | 12 | 48.4 | 30.8 | 0.85 |
| 6 | Comparative | Nuchar ® SA-1500 | CMC | 10 | 31.9 | 27.2 | 0.80 |
| 7 | Comparative | Nuchar ® SA-1500 | UHMWPE | 15 | 33.4 | 30.6 | 0.68 |
| 8 | Exemplary Embodiment | Nuchar ® SA-1500 | PTFE | 5 | 27.6 | 26.1 | 0.94 |

*Normalized to the weight % of carbon in formula, that is, the Fraction of NG Pore Volume is the amount of the NG pore volume of the carbon in the resulting monolith on a binder-free basis relative to the NG pore volume in the starting ingredient carbon.

As such, the non-aqueous binders of the present disclosure demonstrate an ability to provide monoliths with superior working gravimetric capacity and volumetric capacity, as compared to monoliths prepared with an aqueous binder. This is attributed to the better retention of the 9-27 Å pore volume from the ingredient adsorbent in the final monolith by the use of a binder of the present disclosure as compared with the comparative binder, as illustrated in FIG. 4.

Example 1: Alkali Activated Carbon Bound with CMC

Alkali activated carbon has been deemed an excellent adsorbent for natural gas due to a significant amount of pore volume in the micropore range (pores <2 nm) and, more importantly determined in the present disclosure, the amount of pore volume in the range of 9-27 Å. Blends were made in a Simpson muller mixer by adding together alkali activated wood-based carbon and CMC at the desired weight ratios (90 wt % carbon to 10 wt % carboxymethyl cellulose (CMC)). The mixer proceeded to mix the ingredients for 5 minutes followed by addition of water at a ratio of water to solids of 1.7:1. Upon water addition, the mixer was continued for an additional 35 minutes. Monoliths were formed from the blend by compression molding in a 4 inch ID cylindrical mold and sufficient material to yield 0.75 inch thickness conducted at 40K psig and room temperature, approximately 70° F. Upon ejection, monoliths were stored at low temperatures (<80° F.) for 48 hours to minimize shrinkage while drying followed by placing inside an oven preset to 110° C. to evaporate remaining water in the monolith. A hole saw with an outer diameter of 1.25 inch was used to core parts from the larger, 4 inch monolith. The performance of the material demonstrated very high adsorptive capacity and good (i.e., low) L/GGE volumetric capacity, attributed to the ingredient carbon. The gravimetric capacity falls in between the gravimetric capacities of the exampled activated carbons made with the same binder (i.e., SA-1500 of Example 6 and coconut shell activated carbon of Example 5). This can be attributed to the type of binder, concentration of binder and density of the activated carbon, thereby requiring a greater monolith mass per GGE of reversible storage.

Example 2: Alkali Activated Carbon Bound with PTFE

Alkali activated wood-based carbon was mixed with a water-diluted 60 wt % PTFE aqueous dispersion to a 50 wt % total moisture blend that was then mixed and sheared in a Simpson pilot muller. The amount of binder was a concentration of 5 wt % PTFE relative to total solids. The mulled blend was dried at 110° C. overnight and then compression molded at 200 psig in a 0.7" ID mold at room temperature 70° F. This example displayed the best volumetric performance of the compared examples (lowest volume per GGE). In addition, it was observed that a weight percent of 5 is sufficient for forming parts, unlike the CMC or UHMWPE binders which require multiples more binder to maintain part integrity.

Example 3: Alkali Activated Carbon Bound with Kyblock® FG-81

Alkali activated carbon was mixed with Kyblock® FG-81 to yield a 10 wt % binder mixture relative to total solids in an Oster blender for 3 minutes. Lesser amounts of this binder in the formulation severely impaired the integrity of the part (data not shown). The mixed powders were added to a 3" ID preheated mold set to 230° C. The mixture was held for 5 minutes followed by pressing to 7000 psig and maintaining constant pressure for 10 minutes. The sample was then depressurized and released when the mold temperature was <150° C. As shown in Table 2, the alkali activated carbon with Kyblock® monolith performance was very comparable to the performance using the PTFE binder and, with its lower volumetric capacity, superior to the aqueous methyl cellulose binder.

Example 4: Coconut Shell Derived Activated Carbon Bound with UHMWPE

Activated carbon derived from coconut shell is used in numerous applications and is the most commercially wide used activated carbon in the world. The coconut carbon used in the examples was commercially acquired from Calgon Corporation. Example 4 was made by mixing coconut carbon and UHMWPE (GUR® by Celanese Corporation) in an Oster blender for 1 minute to yield a blend having 15 wt % binder. Lower binder concentrations were insufficient to form a structural part (data not shown). Parts were made by adding blends to a preheated 1.5 inch ID mold at a temperature reading of 232° C. and holding for 30 minutes followed by pressurizing to 15,000 psig for 1 minute. The performance values on the part were substantially worse when compared to the examples of the present disclosure. This is because of the lower amount of pore volume in the desired range and the binder effect on the activated carbon which significantly impaired the desirable pore volume.

Example 5: Coconut Shell Derived Activated Carbon Bound with CMC

Activated carbon derived from coconut shell was made into a monolith part by the method outlined in Example 1. The CMC bound monolith Example 5 had better volumetric performance than Example 4 (i.e., the coconut shell activated carbon bound with UHMWPE). However, the two coconut shell monoliths (i.e., bound with CMC or UHMWPE) had similar gravimetric performance. Coconut carbon is known to be a relatively high density carbon which is reflected in the vast inferior gravimetric performance (high lb/GGE) of Examples 4 and 5.

Example 6: Nuchar® SA-1500 Bound with CMC

Nuchar® SA-1500 activated carbon is characterized as having a significant amount of pore volume in the large micropore size, and a significant amount of mesopore volume in the 20-50 Å in size; significantly larger than the focal point of previous adsorbents used for natural gas adsorption, which as discussed above is 9-12 Å. A monolith was formed as outlined in Example 1, but using Nuchar® SA-1500 carbon as well as 2 wt % polyester 6 denier x ¼ inch length non-binding fibers (e.g., 4DG® fibers from Fiber Innovation Technology, Inc. with a formulation of 88 wt % carbon, 10 wt % CMC, 2 wt % fibers). The polyester fibers were an added level of complexity to the process, intended for improving the wicking of internal moisture from the monolith through the drying and curing steps, and thereby improving the physical integrity of the resulting monolith article. Although Example 6 performed significantly better than the coconut carbon examples in terms of reversible natural gas storage capacity, its performance was inferior to the alkali activated carbon examples or examples that incorporated a non-aqueous binder described herein with Nuchar®.

Example 7: Nuchar® SA-1500 Activated Carbon Bound with UHMWPE

Nuchar® SA-1500 and UHMWPE (GUR® by Celanese Corporation) were mixed as outlined in Example 4 to form a monolith. The UHMWPE significantly reduced pore volume in the desired range, which directly relates to the worse gravimetric and volumetric performance observed.

Example 8: Nuchar® SA-1500 Activated Carbon Bound with PTFE

Nuchar® SA-1500 and a 60 wt % polytetrafluoroethylene dispersion were mixed at a ratio of 19:1 Nuchar® SA-1500 to polytetrafluoroethylene (i.e., 5 wt % PTFE). The material was blended as in Example 2 with a similar addition of water, and then dried in a tray oven (set to 110° C.) to evaporate water. The dried material was added to a 3 inch ID compression mold preheated to 210° C. and held for 5 minutes followed by pressurizing at 7,000 psi and maintaining constant pressure for 10 minutes. The use of heat enhances the compaction of the carbon and binder coupled with the low occlusion of pore volume in the desired region, and results in superior volumetric performance compared to the CMC and UHMWPE. Furthermore, the lower quantity of binder allows for more adsorbent to be used in the monolith. Note that the natural gas adsorption performance testing for Example 8 was conducted in a 1 L Parr stainless steel reactor. The sequence of steps outlined previously for determining natural gas/methane adsorption performance remained the same with the exception that an aluminum sleeve was inserted to better fit the diameter of the monoliths in the pressure vessel. The benefit for the Parr is the larger internal volume is closer to the internal volume of an actual fuel tank in addition to larger sample size which reduces the magnitude of the PV=znRT correction for the natural gas in the void spade outside the monolith external dimensions.

Dimensional and Volume Consistency of the Monolith Size

Figure 7:
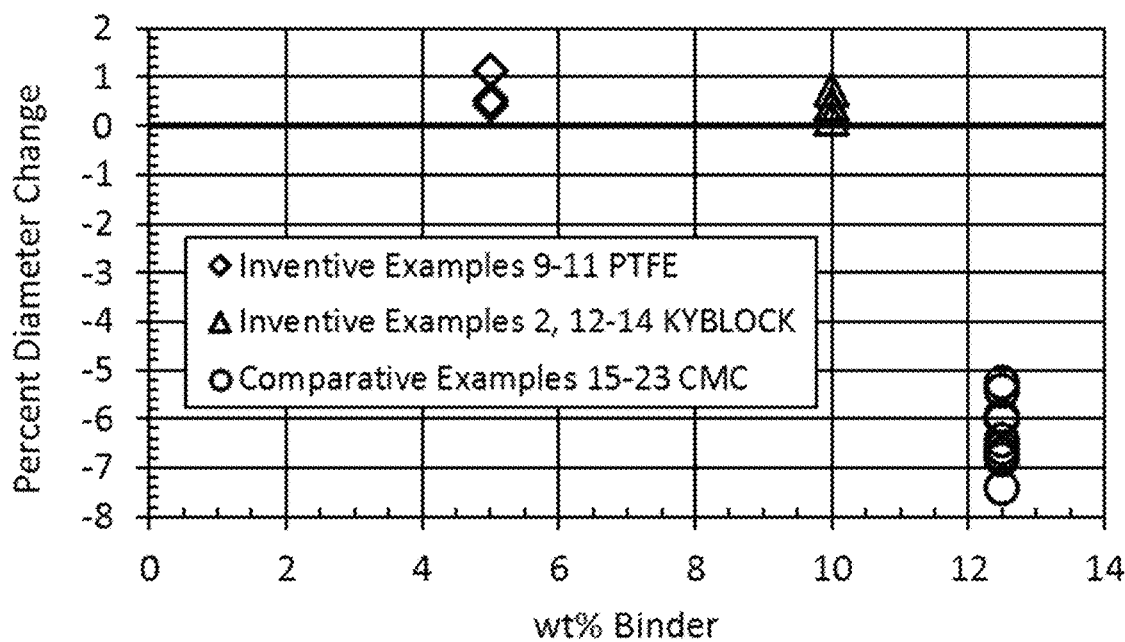
FIG. 7 compares the Dimensional Changes encountered by cylindrical puck monoliths prepared with alternative binder formulations, between the initial shaping of the monolith (i.e., the inner diameter of the die) and after any subsequent heating and/or drying process steps.
Figure 8:
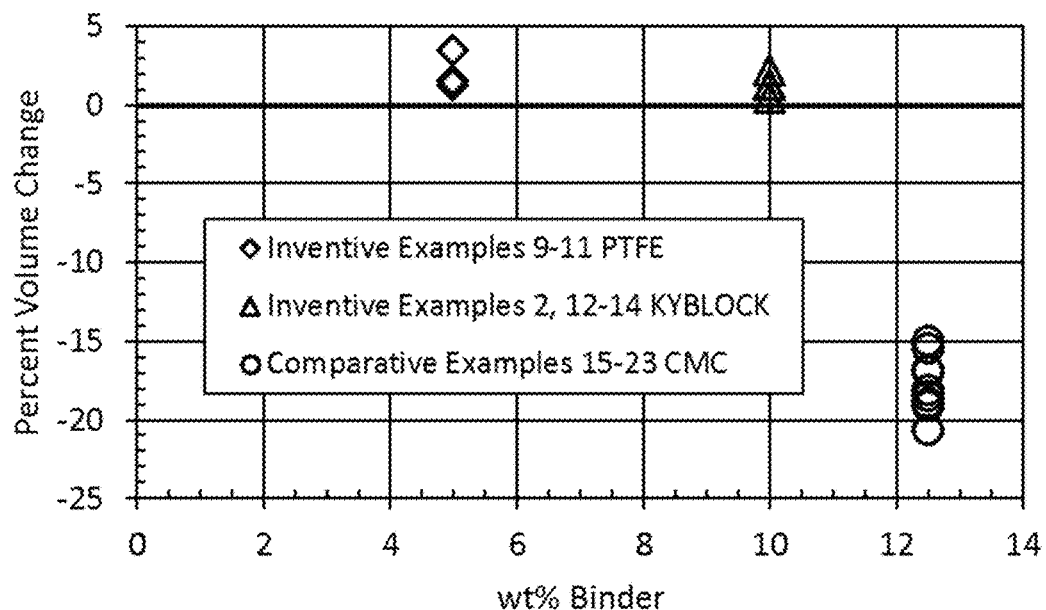
FIG. 8 compares the Volume Changes encountered by cylindrical puck monoliths prepared with alternative binder formulations, between the initial shaping of the monolith (i.e., the inner diameter of the die and the initial compressed or cut length of the cylinder) and after any subsequent heating and/or drying process steps.

Table 3, FIG. 7, and FIG. 8 compare the dimensional and volume consistency of cylindrical monoliths prepared with alternative binder formulations. As explained below, little dimensional change or volume change across the steps of producing a natural gas storage monolith, and with little variability in those changes, are highly prized for maximizing the storage performance of the fuel tank.

The percent Diameter Change, dD, is the percent difference, relative to the diameter of the monolith when initially shaped, of that initially shaped diameter (specifically, the inner diameter of the mold or extrusion die), and the measured diameter of the finished monolith after extrusion or removal from a mold, and after any subsequent drying or heat treatments. The percent Volume Change, dV, is the relative change in the monolith volume, from its initial shaping, to its finished state after any drying and heat treatments, and was derived as the cubic effect of the measured dD value. As such, the dV values in Table 3 were calculated as $100\,[(1+dD/100)^3-1]$. The Volume Change Range, VCR, was the difference between the maximum and minimum dV values for each binder type in Table 3 (e.g., the VCR for CMC binder examples is 5.6%, as the difference between −15.0% and −20.6%), and is a measure of the variability in volume for monoliths to be formed with a particular binder.

TABLE 3

Comparison of dimensional and volume consistency of monoliths when formulated with alternative binders

| Example | Type | Carbon | Binder | Binder Conc, wt % | Diameter Change, (dD), % | Volume Change, (dD), % | Volume Change Range % |
|---|---|---|---|---|---|---|---|
| 9 | Exemplary Embodiment | Nuchar ®SA-1500 | PTFE | 5 | 1.1 | 3.5 | 2.2 |
| 10 | Exemplary Embodiment | Nuchar ®SA-1500 | PTFE | 5 | 0.5 | 1.6 | |
| 11 | Exemplary Embodiment | Nuchar ®SA-1500 | PTFE | 5 | 0.4 | 1.3 | |
| 12 | Exemplary Embodiment | Wood-based phos acid activated P | KYBLOCK ® | 10 | 0.7 | 2.2 | 1.8 |
| 13 | Exemplary Embodiment | Wood-based phos acid activated A | KYBLOCK ® | 10 | 0.4 | 1.3 | |
| 2 | Exemplary Embodiment | Wood-based KOH activated | KYBLOCK ® | 10 | 0.4 | 1.3 | |
| 14 | Exemplary Embodiment | PICA PW-2 | KYBLOCK ® | 10 | 0.1 | 0.4 | |
| 15 | Comparative | Wood-based phos acid activated B | CMC | 12.5 | −5.3 | −15.0 | 5.6 |
| 16 | Comparative | Wood-based phos acid activated C | CMC | 12.5 | −5.4 | −15.4 | |
| 17 | Comparative | Wood-based phos acid activated D | CMC | 12.5 | −5.9 | −16.8 | |
| 18 | Comparative | Wood-based phos acid activated E | CMC | 12.5 | −6.0 | −16.9 | |
| 19 | Comparative | Wood-based phos acid activated F | CMC | 12.5 | −6.4 | −18.1 | |
| 20 | Comparative | Wood-based phos acid activated G | CMC | 12.5 | −6.6 | −18.5 | |
| 21 | Comparative | Wood-based phos acid activated H | CMC | 12.5 | −6.7 | −18.9 | |
| 22 | Comparative | Wood-based phos acid activated I | CMC | 12.5 | −6.8 | −19.1 | |
| 23 | Comparative | Wood-based phos acid activated J | CMC | 12.5 | −7.4 | −20.6 | |

Examples Monoliths of the Present Disclosure 9-11: Nuchar® SA-1500 Bound with PTFE Cylindrical monoliths of PTFE-bound Nuchar® SA-1500 were prepared in the same manner as Example 8, using the same binder, the same 5 wt % binder content, and the same 3.00" inner diameter mold for shaping.

Example Monoliths of the Present Disclosure 12-14: KYBLOCK® Bound-Monoliths

Cylindrical monoliths of KYBLOCK®-bound activated carbons were prepared in the same manner as Example 3, using the same binder, the same 10 wt % binder content, and a 3.00" inner diameter mold for shaping. A phosphoric acid wood-based carbon 'P' and was used in making Example 12.

Another phosphoric acid-activated A and a KOH-activated wood-based carbon used for Examples 13 and 14, respectively, were lab prepared. PICA PW-2 is a commercial grade, coconut-based carbon that was presumably thermally activated.

Comparative Examples 15-23: Wood-Based Phosphoric Acid-Activated Carbons Bound with CMC Cylindrical monoliths of CMC-bound activated carbons were prepared using the 7HF-grade Aqualon® CMC as binder and a 4.00" inner diameter mold for shaping. The phosphoric acid-activated wood-based carbons A though I that were used in making the monoliths were lab prepared with different pore volumes and pore size distributions. The formulation for the monoliths was 85.5 wt % activated carbon, 12.5 wt % CMC, and 2 wt % polyester 6 denier x ¼ inch fiber (4DG® from Fiber Innovation Technology, Inc.). The processing consisted of adding the dry ingredients into a pilot Simpson muller mixer and mixing for 5 minutes, followed by adding water to bring the total concentration of liquid to solids to 1:1, and then mixing an additional 35 minutes. The non-binding polyester fiber ingredient improved the integrity of the monoliths through the processing steps.

As shown in FIG. 7 and Table 3, the examples of the present disclosure with PTFE and KYBLOCK® binders experienced much less Diameter Change, dD, compared with the diameter of its initially formed dimensions, along with much less variability in that change, compared with the CMC-bound comparative examples. As shown in FIG. 8, the resulting Volume Change and Volume Change Range were much lower for the examples of the present disclosure.

Smaller values for Volume Change Range are especially desirable for adsorbent monoliths produced for ANG fuel tanks because the maximum fill with adsorbent maximizes the tank's storage capacity and provides a more consistent adsorbent fill from tank to tank during manufacture. That is, for a tank constructed for accepting a monolith of no larger than set target dimensions, less variability in the monolith dimensions will allow that monolith to be consistently formed with dimensions closer to the tank design target and, therefore, allows the tank to contain a greater and more consistent charge of adsorbent, and thereby realize a greater and more consistent fuel storage capacity. Furthermore, with a monolith closer to the internal dimension of the fuel tank vessel internal dimensions, there is less chance for movement and degradation of the monolith fill during use, which is especially desirable for a passenger vehicle, e.g., noise and rattle otherwise generated over time from fractured monoliths. Therefore, by having binders based on mechanical adhesion, as described herein, in addition to having less and more consistent maintenance of the useful adsorptive porosity and in addition to accommodating a greatly simplified process, a greater and more reliable adsorbent fill in the fuel tank is now possible, compared with aqueous or solubilized binders.

Figure 9:
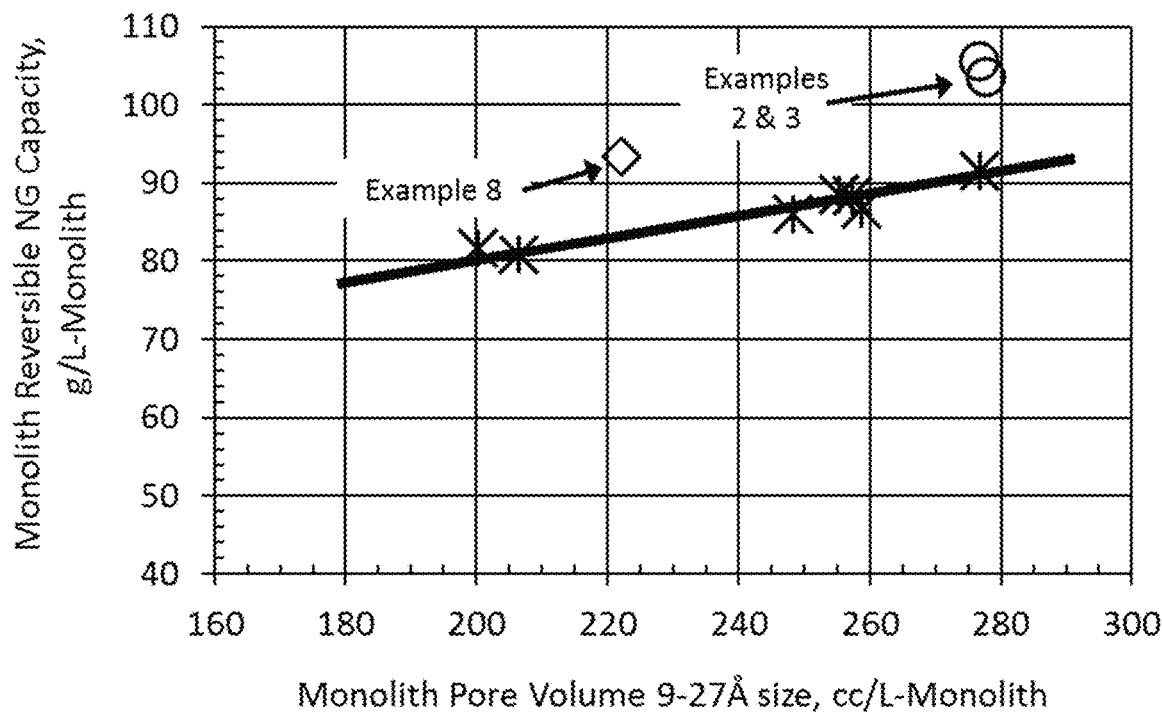
FIG. 9 shows the exemplary pore volumes and recoverable or reversible storage capacities of example monoliths in accordance with the present disclosure on a monolith volume basis.

Further Examples of Monoliths with Exemplary Pore Volume and Recoverable NG Storage Table 4 and FIG. 9 share further examples monoliths of the present disclosure with exemplary pore volumes and recoverable or reversible storage capacities based on monolith volumes.

The Reversible NG Capacity on a volume monolith basis, g/L-M, was determined by multiplying the Reversible NG Capacity (g/100 g-M) by 10 to convert from "per 100 g-M" to "per kg-M", followed by multiplying by the monolith density (kg/L to yield g/L.

TABLE 4

Exemplary pore volumes and recoverable or reversible storage capacities of example monoliths of the present disclosure based on monolith volumes

| Example | Carbon | Binder | Monolith Density, kg/L | Pore Volume 9-27 Å Size, cc/g-M | Pore Volume 9-27 Å Size, cc/L-M | Reversible NG Capacity, g/100 g-M | Reversible NG Capacity, g per L-M | Volumetric Capacity, L-M/GGE |
|---|---|---|---|---|---|---|---|---|
| 2 | Wood-based KOH activated | 5 wt % PTFE | 0.409 | 0.679 | 278 | 23.5 | 107.3 | 24.8 |
| 3 | Wood-based KOH activated | 10 wt % KYBLOCK heated | 0.451 | 0.614 | 277 | 22.6 | 109.4 | 24.3 |
| 12 | Wood-based phos-acid activated P | 10 wt % KYBLOCK heated | 0.475 | 0.422 | 200 | 16.9 | 85.9 | 31.4 |
| 13 | Wood-based phos-acid activated A | 10 wt % KYBLOCK heated | 0.558 | 0.370 | 206 | 15.9 | 87.0 | 31.7 |
| 24 | Wood-based phos-acid activated K | 5 wt % PTFE | 0.458 | 0.604 | 277 | 19.2 | 94.1 | 28.0 |
| 25 | Wood-based | 5 wt % PTFE | 0.396 | 0.654 | 259 | 19.8 | 89.9 | 29.6 |

TABLE 4-continued

Exemplary pore volumes and recoverable or reversible storage capacities of example monoliths of the present disclosure based on monolith volumes

| Example | Carbon | Binder | Monolith Density, kg/L | Pore Volume 9-27 Å Size, cc/g-M | Pore Volume 9-27 Å Size, cc/L-M | Reversible NG Capacity, g/100 g-M | Reversible NG Capacity, g per L-M | Volumetric Capacity, L-M/GGE |
|---|---|---|---|---|---|---|---|---|
| 26 | phos-acid activated L Wood-based | 5 wt % PTFE | 0.409 | 0.629 | 257 | 19.8 | 91.5 | 29.1 |
| 27 | phos-acid activated M Wood-based | 5 wt % PTFE | 0.397 | 0.643 | 255 | 20.3 | 92.8 | 29.0 |
| 28 | phos-acid activated N Wood-based | 5 wt % PTFE | 0.416 | 0.597 | 248 | 19.1 | 89.5 | 29.8 |
| 8 | phos-acid activated O Wood-based phos-acid activated | 5 wt % PTFE heated | 0.479 | 0.489 | 222 | 19.5 | 93.4 | 27.5 |

Example Monoliths of the Present Disclosure 24-28: Wood-Based Phosphoric Acid-Activated Carbons Bound with PTFE Examples 24-28 were prepared similar to Example 2. The phosphoric acid-activated wood-based carbons K though O that were used in making the monolith examples were prepared with different pore volumes and pore size distributions. In contrast with the monolith formation of these examples, Example 8 employed heating as part of the compression step.

FIG. 9 shows, on a volumetric basis for these alternative bound adsorbents in Table 4, that there is an increase in reversible storage performance for natural gas with increased pore volume in pores 9-27 Å in size/diameter. Example monoliths of the present disclosure 2, 3, and 8 appear to have a boost in performance that is above the trend for Examples 24-28, perhaps by virtue of the compression under heat or the special KOH activation methods employed. Regardless of the drive for enhanced capacity for some examples beyond the measured 9-27 Å size pore volume for the Examples 24-28, it is clear that monolith articles with exceptional NG pore volumes of the 9-27 Å size were readily prepared by the methods described herein with more than about 200 cc/L-monolith, and with more than about 80 g/L-monolith (less than about 32 L-M/GGE) reversible natural gas capacity.

Additional Nonaqueous Binder Examples

Alternative polymers beyond those employed in the above Examples were found to successfully bind carbon by the simple method of blending ingredients with shear, drying the blend, and final heated compression of the dried blend for generating a well-formed cylindrical monolith. The activated carbon was commercial-grade Nuchar™ SA-1500. The typical procedure was to blend approximately 10 wt % polymer on a total solids basis with added water to bring the entire mixture moisture content to 50 wt % in a mortar and pestle, to dry the blend at 110° C. overnight, and then to compress the dried blend in a piston die mold heated to 10° C. above the polymer's softening point.

Polyphenylene Sulfide (PPS).

Celanese Fortron® 0205B4-grade polyphenylene sulfide powder (8 wt % moisture) was tested and successfully formed into a cylinder monolith. The procedure was to add 32.87 g of activated carbon to a mortar, followed by a pipetted aliquot of 2.67 g of FEP that had been diluted/dispersed in 17.8 g of water. The mixture was blended with a pestle for 2 minutes, and then dried. The 1" inner diameter piston die mold was heated to 250° C. An aliquot of 3.05 g of dried material was added to the mold and the mold was pressurized to 2500 psig and held for 5 min at 250° C. The mold was cooled at about 2.5° C./min to 50° C. The molded monolith part was slowly depressurized and carefully ejected. A very good part was generated.

Polyimide.

Michelman HP1632-grade polyimide dispersion (14.9 wt % solids) was tested and successfully formed into a cylinder monolith. The procedure was to add 16.34 g of activated carbon to a mortar, followed by a pipetted aliquot of 8.95 g of polyimide that had been diluted with 1.4 g of water. The mixture was blended with a pestle for 90 seconds, and then dried. The 1" inner diameter piston die mold was heated to 240° C. An aliquot of 5.16 g of dried material was added to the mold and the mold was pressurized, after a two minutes pause, to 2500 psig and held for 5.75 min at 250° C. The mold was cooled at about 2.5° C./min to 50° C. The molded monolith part was slowly depressurized and carefully ejected. A good part was generated.

Polyamide (Nylon 66).

Michelman PA845H-grade polyamide dispersion (29.3 wt % solids) was tested and successfully formed into a cylinder monolith. The procedure was to add 16.34 g of activated carbon to a mortar, followed by a pipetted aliquot of 4.56 g of polyamide that had been diluted with 5.83 g of water. The mixture was blended with a pestle for 90 seconds, and then dried. The 1" inner diameter piston die mold was heated to 190° C. An aliquot of 4.62 g of dried material was added to the mold and the mold was pressurized, after a two minutes pause, to 2500 psig and held for 5 min at 250° C. The mold was cooled at about 2.5° C./min to 50° C. The molded monolith part was slowly depressurized and carefully ejected. A very good part was generated. An alternative polyamide, Michelman PA874-grade dispersion (18.3 wt % solids), yielded a similarly excellent monolith. In this example, the same amount of activated carbon was blended with 7.28 g of dispersion that had been diluted with 3.07 g water. The amount of dried blend to be compressed was 3.39 g. All other conditions were the same.

Perfluoroalkoxy Alkane.

Chemours PFAD 335D-grade perfluoroalkoxy alkane (PFA) dispersion (60.75 wt % solids) was tested and successfully formed into a cylinder monolith. The procedure was to add 32.7 g of activated carbon to a mortar, followed by a pipetted aliquot of 4.39 g of PFA that had been diluted with 16.3 g of water. The mixture was blended with a pestle for 120 seconds, and then dried. The 1" inner diameter piston die mold was heated to 190° C. An aliquot of 3.23 g of dried material was added to the mold and the mold was pressurized, after a two minute pause, to 2500 psig and held for 5 minutes at 190° C. The mold was cooled at about 2.5° C./minutes to 50° C. The molded monolith part was slowly depressurized and carefully ejected. A good part was generated.

Fluorinated Ethylene Propylene.

Chemours FEPD 121-grade fluorinated ethylene propylene dispersion (8 wt % moisture) was tested and successfully formed into a cylinder monolith. The procedure was to add 32.69 g of activated carbon to a mortar, followed by a pipetted aliquot of 4.62 g of FEP that had been diluted/dispersed in 16.9 g of water. The mixture was blended with a pestle for 2 minutes, and then dried. The 1" inner diameter piston die mold was heated to 190° C. An aliquot of 3.40 g of dried material was added to the mold and the mold was pressurized, after a two minute pause, to 2500 psig and held for 5 min at 190° C. The mold was cooled at about 2.5° C./minutes to 50° C. The molded monolith part was slowly depressurized and carefully ejected. A good part was generated.

Lightweight Example Monoliths of the Present Disclosure

"Hard" carbons with relatively low surface area (e.g., <1400 $m^2/g$ as measured by $N_2$ BET surface area) have been used for the manufacture of bound monolith blocks because these carbons are easily amenable to the known state of the art of manufacturing (e.g., WO 2017/031260), which is satisfactory for the filtration applications for which these blocks are typically used. In contrast, soft carbons with 1400+$m^2/g$ area defy economical production of monoliths, and yet these materials were discovered to otherwise excel in natural gas storage.

It was found that monolith blocks for natural gas storage can readily be made by the nonaqueous binder system of the present disclosure and the process of the present disclosure using only soft carbons in the monolith formulation. The added advantage of soft carbons significantly lower weight of the monolith fill for a fuel tank. FIG. 5 shows the superior weight of the shaped soft carbons by the present disclosure, in terms of equivalent GGE fuel capacity of an ANG fuel tank and in terms of volume of the ANG tank. Using the projection of a 1% improvement in fuel economy with a 30 lb reduction in vehicle weight, it is apparent that there would be a significant boost in the range of the vehicle beyond the energy value of the stored fuel, of 1.8% to 3.9% for the Table 5 examples, by employing a high surface area "soft" carbon formed into a low density (low mass per unit volume) monolith. So, while there is value to the natural gas adsorption capacity by densely packing the particle adsorbent powder into a monolith, doing so with a low resulting monolith mass has added value to the vehicle range beyond the recoverable fuel gas.

TABLE 5

Within a group of Examples of the present disclosure, vehicle weight reduction and improved fuel economy with lower density, hard carbon-based monoliths for the ANG fuel tank

| Example | 14 | 3 | 2 | 24 | 27 | 8 |
|---|---|---|---|---|---|---|
| Carbon | Coconut thermally activated | wood-based KOH-activate | | wood-based acid-activated | | |
| Carbon "Class" | "hard" | "soft" | "soft" | "soft" | "soft" | "soft" |
| Binder | 10% KYBLOCK | 10% KYBLOCK | 5% PTFE | 5% PTFE | 5% PTFE | 5% PTFE |
| Monolith Density, kg/L | 0.718 | 0.451 | 0.409 | 0.458 | 0.397 | 0.479 |
| Monolith BET Surface Area, $m^2/g$ | 908 | 2183 | 2364 | 1933 | 2136 | 1713 |
| Monolith BET Surface Area, m2/cc- monolith | 652 | 985 | 967 | 885 | 848 | 821 |
| Reversible NG Capacity, g/100 g | 11.0 | 23.4 | 25.3 | 20.0 | 22.3 | 19.5 |
| Reversible NG Capacity, g per L-Monolith | 79.0 | 105.5 | 103.5 | 91.6 | 88.5 | 93.4 |
| Volumetric Capacity, L-M/GGE | 32.5 | 24.3 | 24.8 | 28.0 | 29.0 | 27.5 |
| Gravimetric Capacity, lb/GGE | 51.5 | 24.2 | 22.4 | 28.3 | 25.4 | 29.0 |
| Monolith Wt for 4GGE Tank, lb | 206 | 97 | 89 | 113 | 102 | 116 |

TABLE 5-continued

Within a group of Examples of the present disclosure, vehicle weight
reduction and improved fuel economy with lower density,
hard carbon-based monoliths for the ANG fuel tank

| Example | 14 | 3 | 2 | 24 | 27 | 8 |
|---|---|---|---|---|---|---|
| Difference in Monolith Weight vs. "Hard" Carbon for 4 GGE, lb | — | −109 | −116 | −93 | −104 | −90 |
| Improvement in Fuel Economy vs "Hard" Carbon for 4GGE | — | −3.6% | −3.9% | −3.1% | −3.5% | −3.0% |
| Monolith Weight for 100 L Tank Fill, lb | 159 | 100 | 90 | 101 | 88 | 106 |
| Difference in Monolith Weight vs. "Hard" Carbon for 100 L, lb | — | −59 | −68 | −57 | −71 | −53 |
| Improvement in Fuel Economy vs "Hard" Carbon for 100 L | — | −2.0% | −2.3% | −1.9% | −2.4% | −1.8% |

Durability of Reversible Natural Gas Capacity after Multiple Refueling Cycles.

A factor often overlooked for the natural gas storage performance of an ANG adsorbent is the durability of the initial cycle performance after multiple refueling cycles, i.e., the loss in reversible capacity with repeated pressurization and depressurization cycles. It was surprisingly discovered that the loss is correlated with the Pt cycle retentivity performance of the adsorbent article or monolith, and specifically to the content of small micropores of 9A size in the article, quantified as cc pores <9 Å size per liter article or monolith. Therefore, some embodiments of the present disclosure use an adsorbent with a lower content of these <9 Å size pores.

Table 6 has data for density, pore volumes for a range of pore sizes, volumetric retentivity for the first cycle of natural gas pressurization-depressurization testing, and reversible natural gas capacity for repeated cycles of pressurization-depressurization testing for examples in accordance with the present disclosure and comparative example. Table 6 provides the data for FIGS. 10, 11, and 12.

TABLE 6

Repeated cycling of pressurization and depressurization of Examples of the present
disclosure and comparative examples

| Example | 12 | 24 | 13 | 2 | 3 | 30 | 1 | 29 |
|---|---|---|---|---|---|---|---|---|
| Type | | | Exemplary Embodiments | | | | Comparative | |
| Carbon | Wood-based phos-acid activated P | Wood-based phos-acid activated K | Wood-based phos-acid activated A | Wood-based KOH activated | Wood-based KOH activated | Wood-based phos-acid activated R | Wood-based KOH activated | Coconut thermally activated |
| Binder | KYBLOCK | PTFE | KYBLOCK | PTFE | KYBLOCK | CMC | CMC | CMC |
| Binder Conc, wt % | 10 | 5 | 10 | 5 | 10 | 8 | 10 | 10 |
| Monolith Density, kg/L | 0.475 | 0.458 | 0.558 | 0.409 | 0.451 | 0.498 | 0.472 | 0.454 |
| Pore Volume of Stated Size, cc/L-M: | | | | | | | | |
| <9 Å | 47.4 | 64.0 | 103.1 | 122.4 | 129.4 | 57.9 | 118.8 | 171.8 |
| 9-12 Å | 51.9 | 84.8 | 80.4 | 124.0 | 121.4 | 64.4 | 114.3 | 42.7 |
| 12-27 Å | 148.4 | 191.9 | 125.9 | 153.7 | 155.3 | 183.7 | 161.5 | 97.2 |
| 27-50 Å | 125.6 | 53.3 | 14.1 | 25.7 | 26.7 | 121.6 | 62.8 | 2.3 |
| 50-490 Å | 100.6 | 13.5 | 13.8 | 5.2 | 6.9 | 93.2 | 2.0 | 9.8 |
| 27-490 Å | 226.1 | 66.7 | 27.9 | 30.9 | 33.7 | 214.8 | 64.8 | 12.2 |
| BET Area, m2/g-M | 1636 | 1933 | 1309 | 2364 | 2182 | 1824 | 2045 | 990 |
| BET Area, m2/cc-M | 777 | 885 | 731 | 967 | 984 | 908 | 965 | 706 |
| 1$^{st}$ Cycle NG Retentivity, g/L-M | 10.5 | 10.5 | 11.7 | 10.2 | 17.1 | 8.5 | 17.0 | 17.8 |

TABLE 6-continued

Repeated cycling of pressurization and depressurization of Examples of the present disclosure and comparative examples

| Example | 12 | 24 | 13 | 2 | 3 | 30 | 1 | 29 |
|---|---|---|---|---|---|---|---|---|
| Volumetric Capacity, L-M/GGE | 31.4 | 28.0 | 30.5 | 24.8 | 24.3 | 27.0 | 20.6 | 30.8 |
| 1st Cycle Reversible NG Capacity, cc/L-M | 81.7 | 91.6 | 84.3 | 103.5 | 105.5 | 95.1 | 124.6 | 83.4 |
| 10th Cycle Reversible NG Capacity, cc/L-M | 78.4 | 85.6 | 80.9 | 101.4 | 92.9 | 91.1 | 111.9 | 75.6 |
| 20th Cycle Reversible NG Capacity, cc/L-M | | 85.2 | | | | | | 72.7 |
| Reversible Capacity Loss 0 → 10 cycles | −4.1% | −6.5% | −4.0% | −2.0% | −12.0% | −4.2% | −10.2% | −9.4% |
| Reversible Capacity Loss 10 → 20 cycles | | −0.5% | | | | | | −3.8% |
| Cumulative Reversible Capacity Loss, 0 → 20 cycles | | −7.0% | | | | | | −13% |

Example 29 was prepared with a thermally activated coconut-based carbon, using a formulation of 88 wt % activated carbon, 10 wt % CMC binder, and 2 wt % non-binding fiber, by the same preparation procedure as Example 6.

Example 30 was prepared with a phosphoric acid active wood-based carbon, using a formulation of 90 wt % activated carbon, 8 wt % CMC, and 2 wt % non-binding fiber, by the same preparation procedure as Example 6.

Table 7 has further data for density, pore volumes for a range of pore sizes, and volumetric retentivity for the first cycle of natural gas pressurization-depressurization testing for example monoliths of the present disclosure. Tables 6 and 7 provide the data for FIGS. 13 through 16.

TABLE 7

Pore volume distribution data for example monoliths of the present disclosure

| Example | 25 | 27 | 26 | 28 | 8 | 14 |
|---|---|---|---|---|---|---|
| Carbon | Wood-based phos-acid activated L | Wood-based phos-acid activated N | Wood-based phos-acid activated M | Wood-based phos-acid activated O | Wood-based phos-acid activated Q | Coconut thermally activated |
| Binder | PTFE | PTFE | PTFE | PTFE | PTFE | KYBLOCK |
| Binder Conc, wt % | 5 | 5 | 5 | 5 | 5 | 10 |
| Monolith Density, kg/L | 0.396 | 0.397 | 0.409 | 0.416 | 0.479 | 0.718 |
| Pore Volume of Stated Size, cc/L-M | | | | | | |
| <9 Å | 44.2 | 48.1 | 52.4 | 64.0 | 67.5 | 152.8 |
| 9-12 Å | 67.5 | 68.6 | 69.0 | 77.1 | 57.1 | 42.0 |
| 12-26.5 Å | 191.3 | 186.8 | 188.4 | 171.2 | 165.3 | 84.3 |
| 26.5-50 Å | 91.1 | 81.0 | 83.7 | 50.2 | 101.8 | 9.5 |
| 50-490 Å | 29.0 | 41.5 | 37.6 | 14.8 | 84.7 | 18.2 |
| 27-490 Å | 120.1 | 122.5 | 121.3 | 65.1 | 186.5 | 27.7 |

TABLE 7-continued

Pore volume distribution data for example monoliths of the present disclosure

| Example | 25 | 27 | 26 | 28 | 8 | 14 |
|---|---|---|---|---|---|---|
| BET Area, m2/g-M | 2174 | 2136 | 2119 | 1944 | 1713 | 908 |
| BET Area, m2/cc-M | 861 | 848 | 867 | 809 | 821 | 652 |
| NG Retentivity, g/L | 4.0 | 4.0 | 4.9 | 5.4 | 11.5 | 15.8 |

Figure 10:
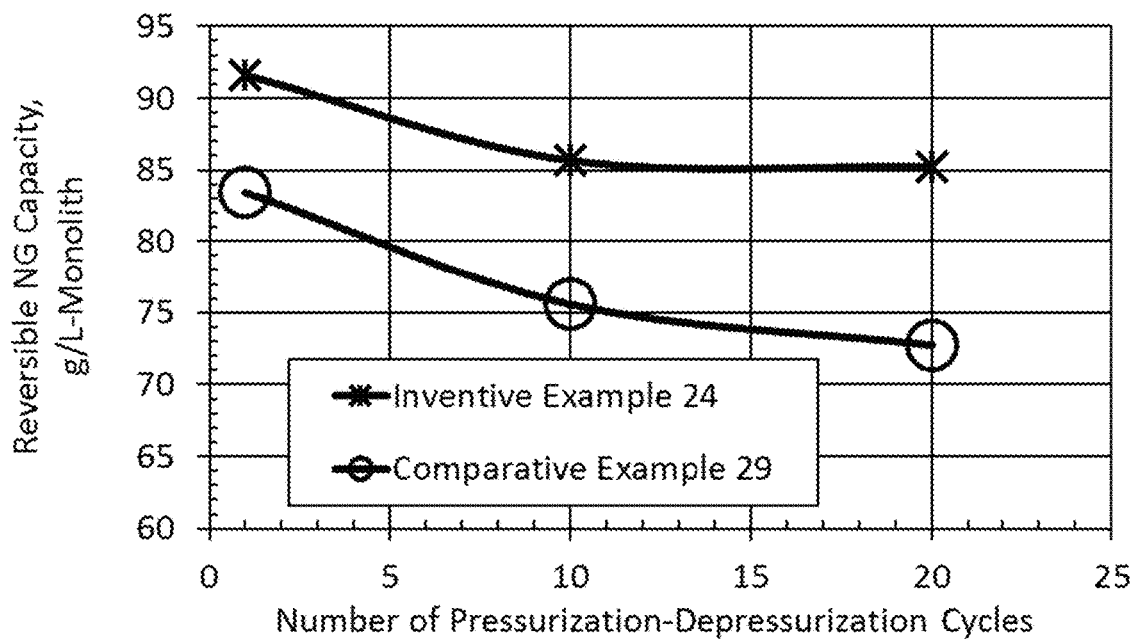
FIG. 10 shows less degradation of reversible natural gas capacity upon repeated saturation and purge cycles by a less microporous (<9 Å size) example of the present disclosure compared with a heavily microporous comparative example.
Figure 11:
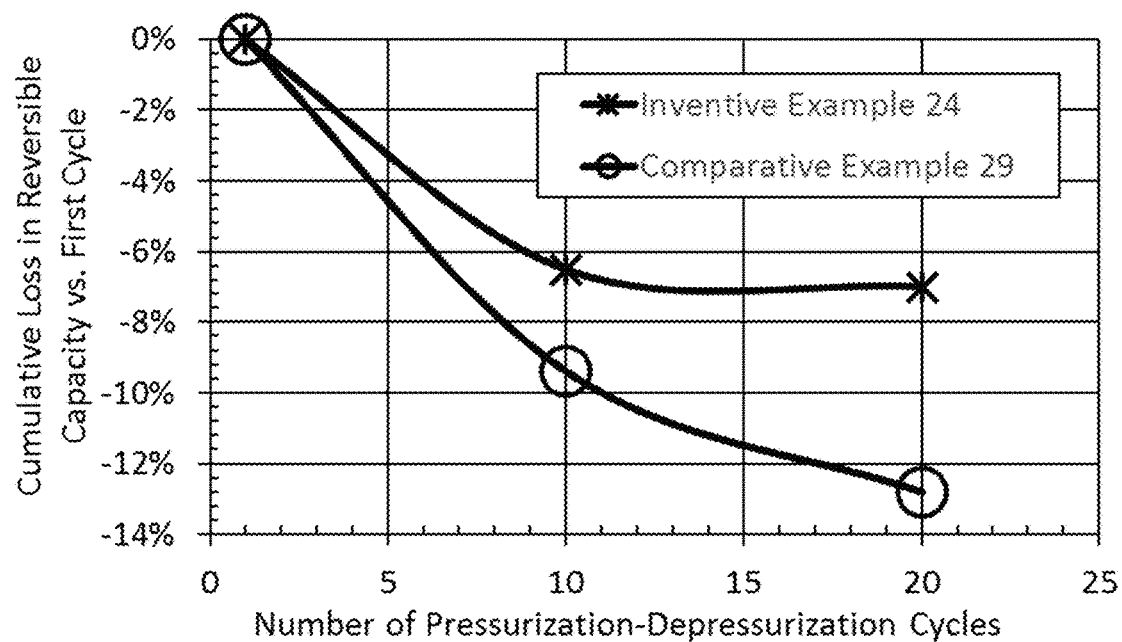
FIG. 11 shows continued degradation of reversible natural gas capacity past 10 cycles of saturation and purge cycles by a heavily microporous comparative example compared with stabilized reversible capacity by a less microporous example of the present disclosure.

As shown in FIG. 10 on a g/L-monolith reversible capacity basis and in FIG. 11 on a percent cumulative loss compared with the first cycle reversible capacity, for the two examples with testing to 20 cycles, the Example monolith 24 is superior to Comparative Example 29 in terms of the level of reversible natural gas storage capacity for a given number of cycles, and especially in terms of the durability of the capacity. That is, the relative loss in capacity over the first 10 cycles compared with the first cycle is much less for Example 24, and without further loss through the subsequent 10 cycles, as opposed to a significant further loss in the subsequent cycles by Comparative Example 29.

Without being bound by theory, it is believed that the loss in reversible capacity is due to accumulation of higher boiling point components and contaminants that are normally present in the fuel mixture known as natural gas, which then accumulate in the porosity of the fuel storage adsorbent as a consequence of repeated pressurization-depressurization, to the detriment of the reversible capacity performance. It is further believed, as might be readily understood by one skilled in the art of adsorbents, that smaller size pores will have greater energy or strength of adsorption. It is asserted here that an adsorbent with its pore volume skewed away from excessively small pores will be less prone to this accumulation of the high boiling point components, with its reversible capacity therefore more durable with repeated refueling. Note that the test gas used in the example was similar to a typical analysis for a natural gas in North America, yet the composition can vary, with substantially higher concentrations of constituents with higher boiling points greater than methane (see the North American Energy Standards Board natural gas specs sheet, www.naesb.org/pdf2/wgq_bps100605w2.pdf). Therefore, it is evident that the loss in reversible capacity could depend on the composition of the natural gas, so that a more durable adsorbent will have a more reliable fuel storage capacity (its useful recoverable storage capacity less variably diminished or affected by the fuel composition) compared with a less durable adsorbent.

Figure 12:
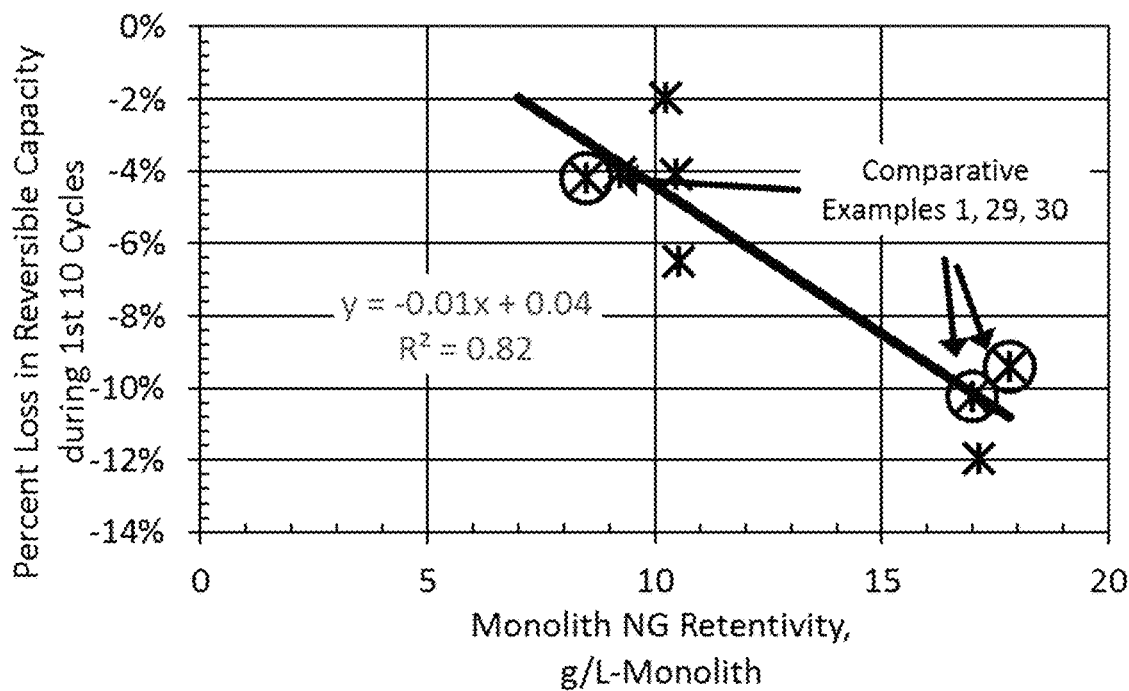
FIG. 12 is a graphical representation depicting the correlation of the percent loss in reversible natural gas capacity with the retentivity of the monolith for natural gas (saturation capacity, less the reversible capacity, for both comparative and examples of the present disclosure on a volumetric monolith basis)

In support of the above mechanism for durability, FIG. 12 shows the correlation of greater loss in reversible capacity from repeated cycling with greater retentivity performance of the adsorbent monolith measured from its first pressurization-depressurization cycle. For example, less than 6% loss in reversible capacity over the first 10 cycles correlates with a first cycle retentivity of less than 12 g/L-monolith. Example 24 has durable reversible capacity from 10 to 20 cycles and has a natural gas retentivity on its first cycle of about 10 g/L-monolith, compared with clearly poorer durability from cycles 10 to 20 by Example 29, which has a first cycle retentivity of 17 g/L-monolith.

Figure 13:
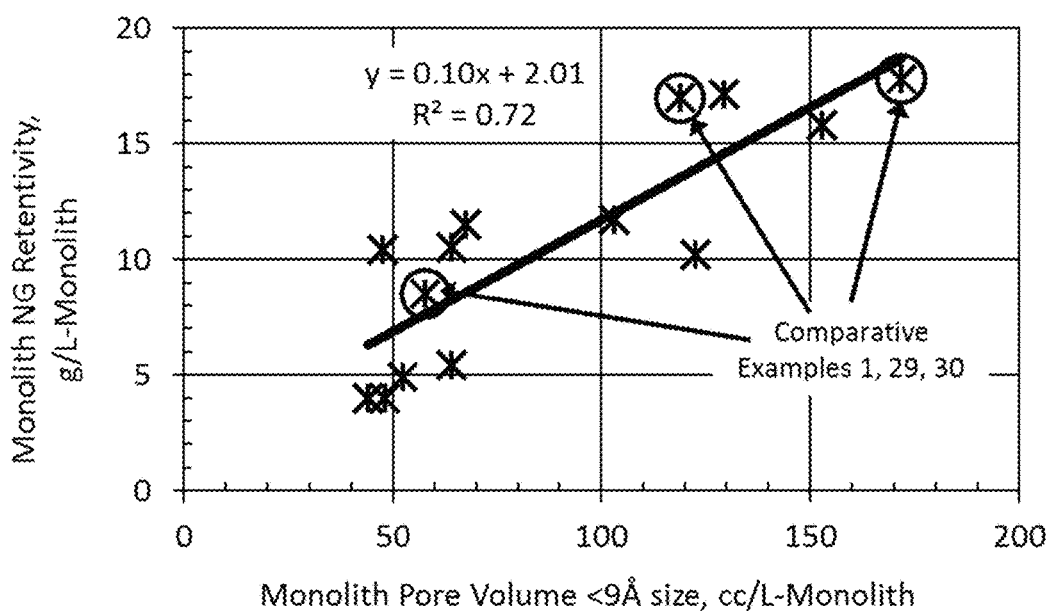
FIG. 13 is a graphical representation depicting the correlation of the retentivity of the monolith for natural gas (saturation capacity, less the reversible capacity) for the first pressurization-depressurization cycle of testing, with the pore volume less than 9 Å size for both comparative and examples of the present disclosure on a volumetric monolith basis.
Figure 16:
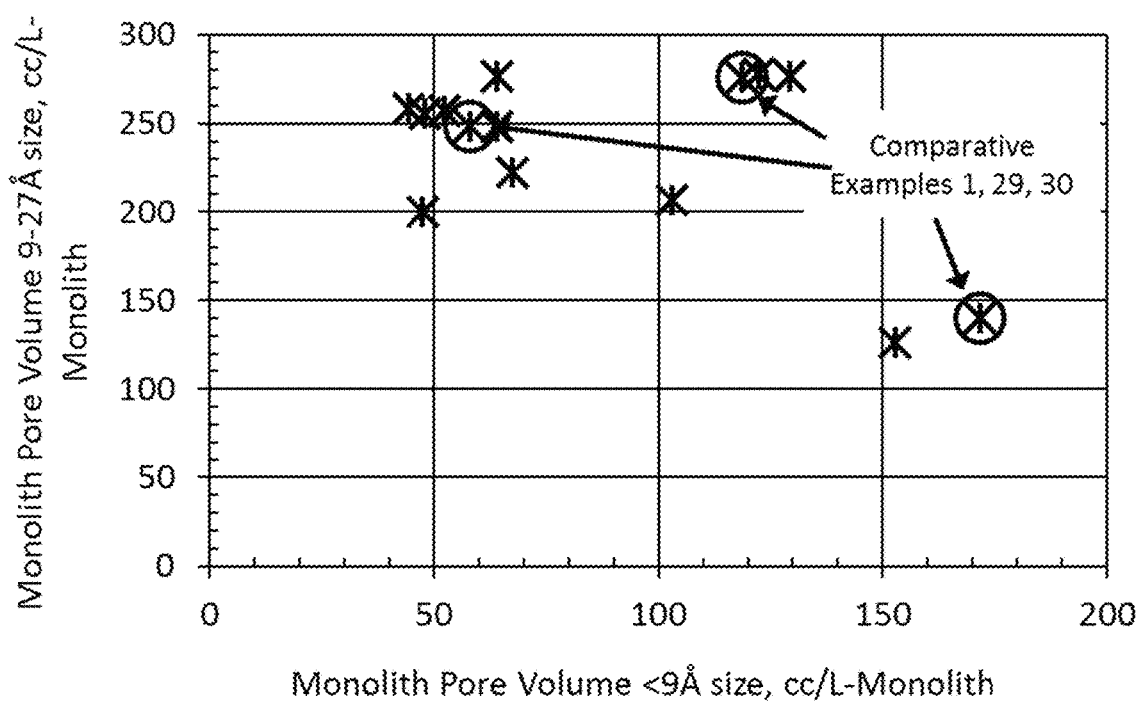
FIG. 16 is a graphical representation comparing the pore volume 9-27 Å size with the pore volume less than 9 Å size for both comparative example and examples of the present disclosure on a volumetric monolith basis.

In order to obtain the favorable durability in reversible capacity, as embodied by examples with lower retentivity of the first cycle, FIG. 13 shows that lower volumes in pores less than 9 Å size are desired. For example, first cycle retentivity of less than 12 g/L-monolith correlates with a pore volume less than 9 Å size of less than 100 cc/L-monolith. As shown in Table 6 and FIG. 15, a focus on 9-12 Å size/diameter, and less than 9 Å size/diameter, without the benefit of understanding durability teaches away from less micropore volume in <9 Å size pores, and hence lower reversible capacity, because those samples with low volume in the 9 Å size pores tend to have less pore volume 9-12 Å size. In fact, the focus on more 9-27 Å size pore volume of the present disclosure for increased reversible capacity does not provide sufficient guidance on superior durability. For example, as shown in FIG. 16, there is similar, 200-277 cc/L 9-27 Å size pore volume for Examples with a range of <9 Å size pore volumes, some with substantially more than, and others with substantially less than, 100 cc/L in pores <9 Å in size.

Figure 14:
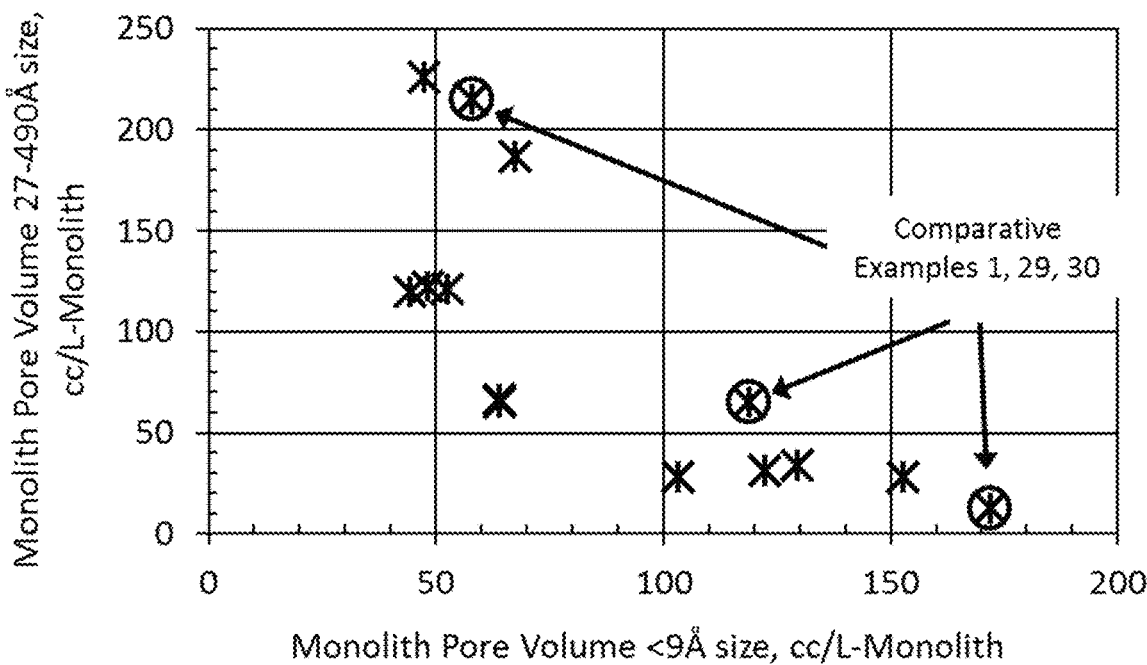
FIG. 14 is a graphical representation comparing the mesopore volume 27-490 Å size with the pore volume less than 9 Å size for both comparative examples and examples of the present disclosure on a volumetric monolith basis.
Figure 15:
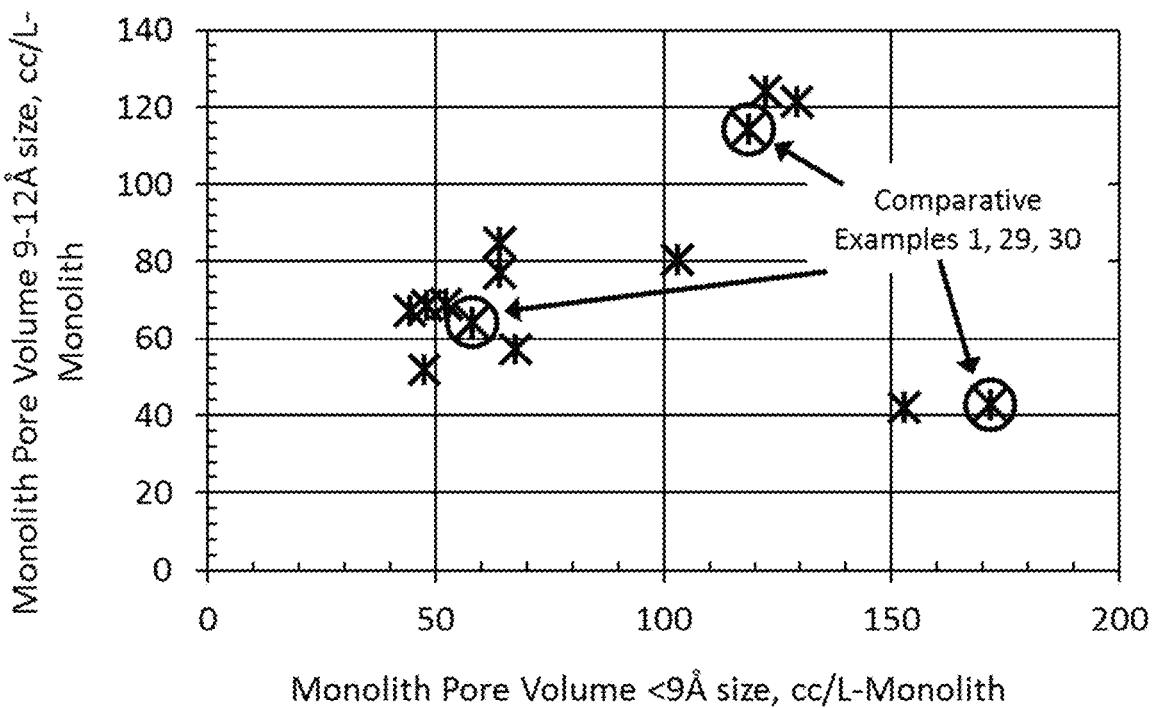
FIG. 15 is a graphical representation comparing the pore volume 9-12 Å size with the pore volume less than 9 Å size for both comparative examples and examples of the present disclosure on a volumetric monolith basis.

It is important to note that pores larger than 27 Å in size, or even larger than 50 Å in size, though perhaps too large from appreciable storage capacity by way of a condensed adsorbed phase, may still play an important contributory role to reversible capacity as a volume for gas pressurization-depressurization that is internal to the constituent adsorbent particles within the monolith. As shown in FIG. 14, attributed to the chemistry and physics of thermal and chemical activation processes, it appears normal to expect increased volume of pores in a larger size within the mesopore range outside of 9-27 Å size, shown here in the 27-490 Å size range, with a reduction in micropore volume, shown here as pores less than 9 Å size. Therefore, by operating within the reduced pore volume in smaller than 9 Å size micropores of some embodiments of the present disclosure, the monolith article would gain the benefit of enhanced reversible capacity from internally compressed gas in pores understood to be too large to create a condensed phase, beyond the reversible capacity afforded from maximizing the volume in pores 9-27 Å size. Per FIG. 14, the volume of these larger, 27-490 Å size mesopores is more than 50 cc/L-monolith when the volume in micropores smaller than 9 Å size is in the range of less than 100 cc/L-monolith.

In total, taking into account the need for high reversible capacity for natural gas as provided by increased pore volume in pores about 9-27 Å size, the need for a durable reversible capacity with repeated pressurization cycling, and the benefit of the compressed gas storage pores, the pore volume distribution of the adsorbent monolith article of the present disclosure includes at least one of: less than about 100 cc/L-M volume in pores smaller than about 9 Å size, more than 200 cc/L-M volume in pores about 9-27 Å size, more than about 50 cc/L-M volume in pores about 27-490 Å size, or a combination thereof. Furthermore, by maximizing the pore volumes both about 9-27 Å and about 27-490 Å size, the mass of the adsorbent monolith is minimized for a given dense packing of the powder in to the article, thereby providing the fuel economy advantages of a lighter weight fuel storage media.

Specific Embodiments

According to an aspect, the present disclosure provides a method of storing a gas. The method comprises: contacting the gas with a gaseous storage system comprising at least one porous gas sorbent monolith having a working gravimetric capacity of 40 lbs/GGE and/or a volumetric capacity of ≤35 L/GGE.

In any aspect or embodiment describe herein, the porous gas sorbent monolith has at least one of: <about 100 cc/L-M volume in pores smaller than about 9 Å size; >about 200 cc/L-M volume in pores about 9-27 Å size; >about 50 cc/L-M volume in pores about 27-490 Å size; a part density of at least 0.4 g/cc; a pore volume for pores with a size in a range from about 9 Å to about 27 Å that is ≥0.5 cc/g; or a combination thereof.

In any aspect or embodiment describe herein, the working gravimetric capacity is ≤40 lbs/GGE.

In any aspect or embodiment describe herein, the volumetric capacity is equal to or less than 30 L/GGE.

In any aspect or embodiment describe herein, the porous gas sorbent monolith comprises a gas adsorbing material and a non-aqueous binder as described herein.

In any aspect or embodiment describe herein, the non-aqueous binder is at least one of a fluoropolymer, a polyamide, a polyimide, fibrillated cellulose, a high-performance plastic, a copolymer with a fluoropolymer, a copolymer with a polyamide, a copolymer with a polyimide, a copolymer with a high-performance plastic, or a combination thereof.

In any aspect or embodiment describe herein, the fluoropolymer is at least one of poly(vinylidene difluoride), polytetrafluoroethylene, or a combination thereof.

In any aspect or embodiment describe herein, the polyamide is at least one of Nylon-6,6', Nylon-6, or a combination thereof.

In any aspect or embodiment described herein, the high-performance plastic is at least one of polyphenylene sulfide, polyketones, or polysulfones.

In any aspect or embodiment describe herein, at least one of: the non-aqueous binder is present in an amount of no greater than 10 wt %; the gas adsorbing material is present in an amount of at least 90 wt %; the non-aqueous binder is a dispersion of about 50 wt % to about 70 wt % of the binder; or a combination thereof.

In any aspect or embodiment describe herein, at least one of: the non-aqueous binder is present in an amount of about 2.5 wt % to about 7 wt % the gas adsorbing material is present in an amount of at least 93 wt %; the non-aqueous binder is a dispersion of about 55 wt % to about 65 wt % of the binder; or a combination thereof.

In any aspect or embodiment describe herein, the gas adsorbing material is at least one of activated carbon, zeolite, silica, metal organic frameworks, covalent organic frameworks, or a combination thereof.

In any aspect or embodiment describe herein, the activated carbon is derived from wood, peat moss, coconut shell, coal, walnut shell, synthetic polymers, and/or natural polymers.

In any aspect or embodiment describe herein, the activated carbon is thermally activated, chemically activated, or a combination thereof.

According to another aspect, the present disclosure provides a porous gas sorbent monolith. The porous gas sorbent monoliths comprises: a gas adsorbing material, wherein the porous gas sorbent monolith has a working gravimetric capacity of ≤40 lbs/GGE and/or a volumetric capacity of ≤35 L/GGE.

In any aspect or embodiment describe herein, the gas sorbent monolith further comprises a non-aqueous binder as described herein.

In any aspect or embodiment describe herein, the non-aqueous binder is at least one of a fluoropolymer a polyamide, a polyimide, fibrillated cellulose, a high-performance plastic, a copolymer with a fluoropolymer, a copolymer with a polyamide, a copolymer with a polyimide, a copolymer with a high-performance plastic, or a combination thereof.

In any aspect or embodiment describe herein, the fluoropolymer is at least one fluoropolymer selected from the group consisting of poly(vinylidene difluoride) and polytetrafluoroethylene.

In any aspect or embodiment describe herein, the polyamide is at least one polyamide selected from the group consisting of Nylon-6,6' and Nylon-6.

In any aspect or embodiment describe herein, the non-aqueous binder is present in an amount of no greater than 10 wt %.

In any aspect or embodiment describe herein, the gas adsorbing material is present in an amount of at least 90 wt %.

In any aspect or embodiment describe herein, the gas adsorbing material is at least one of activated carbon, zeolite, silica, metal organic frameworks, covalent organic frameworks, or a combination thereof.

In any aspect or embodiment describe herein, the activated carbon is derived from wood, peat moss, coconut shell, coal, walnut shell, synthetic polymers and/or natural polymers.

In any aspect or embodiment describe herein, the activated carbon is thermally activated, chemically activated, or a combination thereof.

In any aspect or embodiment describe herein, the monolith has at least one of the following: a part density of ≥0.4 g/cc; the working gravimetric capacity is ≤30 lbs/GGE; the volumetric capacity is less than 30 L/GGE; the gas adsorbing material is present in an amount of at least 93 wt %; the non-aqueous binder is present in an amount of about 2.5 wt % to about 7 wt %; the non-aqueous binder is a dispersion of about 50 wt % to about 70 wt % of the binder; a pore volume for pores with a size in a range from about 9 Å to about 27 Å that is ≥0.5 cc/g; or a combination thereof.

In any aspect or embodiment describe herein, the part density is in a range of about 0.4 g/cc to about 0.75 g/cc.

In any aspect or embodiment describe herein, the part density is in a range of about 0.4 g/cc to about 0.6 g/cc.

In any aspect or embodiment describe herein, the working gravimetric capacity is ≤28 lbs/GGE.

According to a further aspect, the present disclosure provides a method of making a porous gas sorbent monolith. The method comprises: admixing a gas adsorbing material and a non-aqueous binder as described herein; and compressing the mixture into a shaped structure or extruding the mixture in a shape.

In any aspect or embodiment describe herein, the method further comprises applying heat to the compressed mixture.

In any aspect or embodiment describe herein, the monolith has at least one of the following: the non-aqueous binder is at least one of a fluoropolymer, a polyamide, a copolymer with a fluoropolymer, a copolymer with a polyamide, or a combination thereof; or the gas adsorbing material is at least one of activated carbon, a zeolite, a silica, a metal organic framework, or a combination thereof; or a combination thereof.

In any aspect or embodiment describe herein, the monolith has at least one of the following: a part density of ≥0.4 g/cc; a working gravimetric capacity of ≤40 lbs/GGE; a volumetric capacity of ≤35 L/GGE; a pore volume for pores with a size in a range from about 9 Å to about 27 Å that is >0.5 cc/g; the gas adsorbing material is present in an amount of at least 90 wt %; the non-aqueous binder is present in an amount no greater than 10 wt %; or a combination thereof.

In any aspect or embodiment describe herein, the monolith has at least one of the following: <about 100 cc/L-M volume in pores smaller than about 9 Å size; >about 200 cc/L-M volume in pores about 9-27 Å size; >about 50 cc/L-M volume in pores about 27-490 Å size; the part density in a range of about 0.4 g/cc to about 0.75 g/cc; the working gravimetric capacity is less than 30 lbs/GGE; the volumetric capacity is less than 30 L/GGE; the gas adsorbing material is present in an amount of at least 93 wt %; the non-aqueous binder is present in an amount of about 2.5 wt % to about 7 wt %; the non-aqueous binder is a dispersion of about 50 wt % to about 70 wt % of the binder; or a combination thereof.

In any aspect or embodiment describe herein, compressing the mixture includes applying at least 1,250 psi of pressure.

In any aspect or embodiment describe herein, the applied pressure is greater than 1,500 psi.

In any aspect or embodiment describe herein, the shaped structure or the extruded shape is a cylinder, an oval prism, a cube, an elliptical prism, an oval prism, or a rectangular prism.

According to yet another aspect, the present disclosure provides a gas storage system. The gas storage system comprises: a container; and a porous gas sorbent monolith disposed therein, wherein the monolith comprises a gas adsorbing material, wherein the porous gas sorbent monolith has a working gravimetric capacity of ≤40 lbs/GGE (e.g., ≤28 lbs/GGE) and/or a volumetric capacity of <35 L/GGE (e.g., <30 L/GGE).

In any aspect or embodiment describe herein, the monolith further comprises a non-aqueous binder as described herein.

In any aspect or embodiment describe herein, the monolith has at least one of the following: the non-aqueous binder is at least one of a fluoropolymer, a polyamide, a copolymer with a fluoropolymer, a copolymer with a polyamide, or a combination thereof; or the gas adsorbing material is at least one of activated carbon, a zeolite, a silica, a metal organic framework, or a combination thereof; or a combination thereof.

In any aspect or embodiment describe herein, the monolith has at least one of the following: the gas adsorbing material is present in an amount of at least 90 wt %; the non-aqueous binder is present in an amount no greater than 10 wt %; the non-aqueous binder is a dispersion of about 50 wt % to about 70 wt % of the binder; or a combination thereof.

In any aspect or embodiment describe herein, the monolith has at least one of the following: a part density of ≥0.4 g/cc; a working gravimetric capacity of ≤40 lbs/GGE; a volumetric capacity of <35 L/GGE; a pore volume for pores with a size in a range from about 9 Å to about 27 Å that is ≥0.5 cc/g; the gas adsorbing material is present in an amount of at least 93 wt %; the non-aqueous binder is present in an amount no greater than 7 wt %; the non-aqueous binder is a dispersion of about 55 wt % to about 65 wt % of the binder; or a combination thereof.

In any aspect or embodiment describe herein, the container is configured to withstand at least 1,000 psi.

In any aspect or embodiment describe herein, approximately 10%, 20%, 30%, 40%, 50%, 60%, 70%, 80%, 90%, 95% or more (including all values and ranges in between) of the pores are in the range of 9-27 Å.

In any aspect or embodiment describe herein, greater than 50%, 60%, 70%, 80%, 90%, 95% or more (including all values and ranges in between) of the pores are in the range of 9-27 Å.

In any aspect or embodiment describe herein, greater than 60% of the pores are in the range of 9-27 Å.

In any aspect or embodiment describe herein, greater than 70% of the pores are in the range of 9-27 Å.

In any aspect or embodiment describe herein, greater than 80% of the pores are in the range of 9-27 Å.

In any aspect or embodiment describe herein, greater than 90% of the pores are in the range of 9-27 Å.

In any aspect or embodiment describe herein, greater than 95% of the pores are in the range of 9-27 Å.

In any aspect or embodiment describe herein, approximately 10%, 20%, 30%, 40%, 50%, 60%, 70%, 80%, 90%, 95% or more (including all values and ranges in between) of the pores are in the range of 12-27 Å.

In any aspect or embodiment describe herein, greater than 50%, 60%, 70%, 80%, 90%, 95% or more (including all values and ranges in between) of the pores are in the range of 12-27 Å.

In any aspect or embodiment describe herein, greater than 30% of the pores are in the range of 12-27 Å.

In any aspect or embodiment describe herein, greater than 40% of the pores are in the range of 12-27 Å.

In any aspect or embodiment describe herein, greater than 50% of the pores are in the range of 12-27 Å.

In any aspect or embodiment describe herein, greater than 60% of the pores are in the range of 12-27 Å.

In any aspect or embodiment describe herein, greater than 70% of the pores are in the range of 12-27 Å.

In any aspect or embodiment describe herein, greater than 80% of the pores are in the range of about 12-27 Å.

In any aspect or embodiment described herein, the monolith of the present disclosure has at least one of: <about 100 cc/L-M volume in pores smaller than about 9 Å size; >about 200 cc/L-M volume in pores about 9-27 Å size; >about 50 cc/L-M volume in pores about 27-490 Å size; or a combination thereof.

While preferred embodiments of the present disclosure have been shown and described herein, it will be understood that such embodiments are provided by way of example only. Numerous variations, changes and substitutions will occur to those skilled in the art without departing from the spirit of the present disclosure. Accordingly, it is intended that the appended claims cover all such variations as fall within the spirit and scope of the invention. Furthermore, the system may comprise at least one device for charging and/or discharging the system or a plurality of devices for charging and/or discharging the system.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the present disclosure described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the present disclosure. Such equivalents are intended to be encompassed by the following claims.

What is claimed is:

1. A method of storing natural gas, the method comprising:
    contacting natural gas with a gaseous storage system comprising a porous gas sorbent material having:
        <about 100 cc/L-M volume in pores smaller than about 9 Å size;
        >about 200 cc/L-M volume in pores about 9-27 Å size; and
        >about 50 cc/L-M volume in pores about 27-490 Å size.

2. The method of claim 1, wherein the volumetric capacity is equal to or less than 30 L/GGE.

3. The method of claim 1, wherein the porous gas sorbent material comprises a gas adsorbing material and a non-aqueous binder.

4. The method of claim 3, wherein the non-aqueous binder is at least one of a fluoropolymer, a polyamide, a polyimide, fibrillated cellulose, a high-performance plastic, a copolymer with a fluoropolymer, a copolymer with a polyamide, a copolymer with a polyimide, a copolymer with a high-performance plastic, and a combination thereof.

5. The method of claim 4, wherein the fluoropolymer is at least one of poly(vinylidene difluoride), polytetrafluoroethylene, fluorinated ethylene propylene, perfluoroalkoxy alkane, or a combination thereof.

6. The method of claim 4, wherein the polyamide is at least one of Nylon-6,6', Nylon-6, Nylon 6, 12, or a combination thereof.

7. The method of any of claim 3, wherein at least one of:
    the non-aqueous binder is present in an amount of no greater than 10 wt %;
    the gas sorbent material is present in an amount of at least 90 wt %;
    the non-aqueous binder is a dispersion of about 50 wt % to about 70 wt % of the binder; or
    a combination thereof.

8. The method of any of claim 3, wherein at least one of:
    the non-aqueous binder is present in an amount of about 2.5 wt % to about 7 wt %;
    the gas sorbent material is present in an amount of at least 93 wt %;
    the non-aqueous binder is a dispersion of about 55 wt % to about 65 wt % of the binder; or
    a combination thereof.

9. The method of any of claim 1, wherein the gas sorbent material is at least one of activated carbon, zeolite, silica, metal organic framework, covalent organic framework, or a combination thereof.

10. The method of claim 9, wherein the activated carbon is derived from wood, peat moss, coconut shell, coal, walnut shell, synthetic polymers, and/or natural polymers.

11. The method of claim 9, wherein the activated carbon is thermally activated, chemically activated, or a combination thereof.

12. An adsorbed natural gas storage system comprising:
    a container having a natural gas inlet and an outlet; and
    a porous gas sorbent material disposed therein, wherein the porous gas sorbent material includes:
        <about 100 cc/L-M volume in pores smaller than about 9 Å size;
        >about 200 cc/L-M volume in pores about 9-27 Å size; and
        >about 50 cc/L-M volume in pores about 27-490 Å size.

13. The adsorbed natural gas storage system of claim 12, wherein the porous gas sorbent material further comprises a non-aqueous binder.

14. The adsorbed natural gas storage system of claim 13, wherein the porous gas sorbent material has at least one of the following:
    (i) the non-aqueous binder is at least one of a fluoropolymer, a polyamide, a polyimide, fibrillated cellulose, a high-performance plastic, a copolymer with a fluoropolymer, a copolymer with a polyamide, a copolymer with a polyimide, a copolymer with a high-performance plastic, or a combination thereof;
    (ii) the gas sorbent material is at least one of activated carbon, a zeolite, a silica, a metal organic framework, covalent organic framework, or a combination thereof; or
    (iii) a combination thereof.

15. The adsorbed natural gas storage system of claim 12, wherein the porous gas sorbent material has at least one of the following:
    the gas adsorbing material is present in an amount of at least 90 wt %;
    the non-aqueous binder is present in an amount no greater than 10 wt %;
    the non-aqueous binder is a dispersion of about 50 wt % to about 70 wt % of the binder;
    or
    a combination thereof.

16. The adsorbed natural gas storage system of claim 12, wherein the porous gas sorbent material has at least one of the following:
    a working gravimetric capacity of ≤40 lbs/GGE;
    a volumetric capacity of <35 L/GGE;
    the gas sorbent material is present in an amount of at least 93 wt %;
    the non-aqueous binder is present in an amount no greater than 7 wt %;
    the non-aqueous binder is a dispersion of about 55 wt % to about 65 wt % of the binder;
    or
    a combination thereof.

17. The adsorbed natural gas storage system of claim 12, wherein the container is configured to withstand at least 1,000 psi.

* * * * *